United States Patent
Cieri et al.

(10) Patent No.: US 11,501,366 B1
(45) Date of Patent: Nov. 15, 2022

(54) INVENTORY MANAGEMENT WITH CAPITAL ADVANCE

(71) Applicant: Block, Inc., San Francisco, CA (US)

(72) Inventors: Michael Morrissey Cieri, San Francisco, CA (US); Adam Jeremy Fern, San Francisco, CA (US); Ding Zhou, San Francisco, CA (US); Ariana Poursartip, San Francisco, CA (US)

(73) Assignee: BLOCK, INC., San Francisco, CA (US)

(*) Notice: Subject to any disclaimer, the term of this patent is extended or adjusted under 35 U.S.C. 154(b) by 0 days.

(21) Appl. No.: 16/777,522

(22) Filed: Jan. 30, 2020

Related U.S. Application Data

(63) Continuation of application No. 14/522,287, filed on Oct. 23, 2014, now Pat. No. 10,565,642.

(51) Int. Cl.
    *G06Q 40/02* (2012.01)
    *G06Q 10/06* (2012.01)
    *G06Q 10/08* (2012.01)

(52) U.S. Cl.
    CPC ..... *G06Q 40/025* (2013.01); *G06Q 10/06315* (2013.01); *G06Q 10/087* (2013.01)

(58) Field of Classification Search
    CPC ........... G06Q 40/025; G06Q 10/06315; G06Q 10/087
    See application file for complete search history.

(56) References Cited

U.S. PATENT DOCUMENTS

| | | |
|---|---|---|
| 5,696,907 A | 12/1997 | Tom |
| 5,963,919 A | 10/1999 | Brinkley et al. |
| 6,249,774 B1 * | 6/2001 | Roden .............. G06Q 10/06315 700/106 |
| 6,307,576 B1 | 10/2001 | Rosenfeld |
| 6,826,544 B1 | 11/2004 | Johnson |
| 6,941,281 B1 | 9/2005 | Johnson |
| 6,996,538 B2 | 2/2006 | Lucas |
| 7,035,821 B1 | 4/2006 | Smith, II et al. |
| 7,103,570 B1 | 9/2006 | Morea et al. |

(Continued)

FOREIGN PATENT DOCUMENTS

| | | | |
|---|---|---|---|
| JP | 2004-118547 A | 4/2004 | |
| WO | 99/03076 A1 | 1/1999 | |
| WO | WO-9903076 A1 * | 1/1999 | ............. G06Q 20/04 |

OTHER PUBLICATIONS

Comptroller of the Currency, "Accounts Receivable and Inventory Financing" (Year: 2000).*

(Continued)

*Primary Examiner* — Scott C Anderson
*Assistant Examiner* — James H Miller
(74) *Attorney, Agent, or Firm* — Mattingly & Malur, PC

(57) ABSTRACT

In some examples, a service provider may manage inventories of items by offering money advances to make inventory orders on behalf of a merchant. The service provider may determine a risk associated with advancing money to the merchant based on sales of items made by the merchant. The service provider may provide a money advance to the merchant when the risk associated with advancing money is within a threshold level. The money advance may be used to order inventory from a supplier. This may assist the merchant in managing inventory.

20 Claims, 10 Drawing Sheets

(56) References Cited

U.S. PATENT DOCUMENTS

| | | | |
|---|---|---|---|
| 7,181,427 B1 | 2/2007 | DeFrancesco et al. | |
| 7,607,577 B1* | 10/2009 | Yu | G06Q 10/087 235/383 |
| 7,797,231 B1 | 9/2010 | Loeb et al. | |
| 7,953,653 B2 | 5/2011 | Siggers et al. | |
| 8,150,764 B2 | 4/2012 | Crowe et al. | |
| 8,239,227 B2 | 8/2012 | Megiddo et al. | |
| 8,606,695 B1 | 12/2013 | Arora et al. | |
| 8,666,847 B1* | 3/2014 | Blank | G06Q 10/087 705/28 |
| 8,732,040 B1 | 5/2014 | Prabhune et al. | |
| 9,519,892 B2 | 12/2016 | Martell et al. | |
| 9,727,912 B1 | 8/2017 | Poursartip et al. | |
| 9,786,005 B1 | 10/2017 | Poursartip et al. | |
| 9,824,394 B1 | 11/2017 | Boates et al. | |
| 9,836,786 B1 | 12/2017 | Baker | |
| 9,892,458 B1 | 2/2018 | Shearer et al. | |
| 9,984,412 B1 | 5/2018 | Poursartip et al. | |
| 10,019,698 B1 | 7/2018 | Scott et al. | |
| 10,062,109 B1 | 8/2018 | Poursartip et al. | |
| 10,346,907 B1 | 7/2019 | Poursartip et al. | |
| 10,445,826 B1 | 10/2019 | Poursartip et al. | |
| 10,453,086 B1 | 10/2019 | Scott et al. | |
| 10,455,826 B2 | 10/2019 | Palomares et al. | |
| 10,565,642 B1 | 2/2020 | Cieri et al. | |
| 10,607,286 B1 | 3/2020 | Poursartip et al. | |
| 10,902,512 B1 | 1/2021 | Fern et al. | |
| 2002/0138412 A1 | 9/2002 | Englert | |
| 2002/0152139 A1* | 10/2002 | Hogan | G06Q 10/087 705/28 |
| 2002/0174061 A1 | 11/2002 | Srinivasan et al. | |
| 2003/0101107 A1 | 5/2003 | Agarwal et al. | |
| 2003/0130959 A1 | 7/2003 | Rosenbaum | |
| 2004/0054625 A1 | 3/2004 | Kellogg et al. | |
| 2004/0064398 A1 | 4/2004 | Browne et al. | |
| 2004/0193540 A1 | 9/2004 | Brown et al. | |
| 2006/0095350 A1 | 5/2006 | Hall et al. | |
| 2006/0095367 A1* | 5/2006 | Iverson | G06Q 20/10 705/39 |
| 2006/0224480 A1 | 10/2006 | Bent et al. | |
| 2007/0156579 A1 | 7/2007 | Manesh | |
| 2007/0156584 A1 | 7/2007 | Barnes et al. | |
| 2007/0174191 A1 | 7/2007 | Keaton et al. | |
| 2007/0244779 A1 | 10/2007 | Wolff | |
| 2007/0255635 A1 | 11/2007 | Multer et al. | |
| 2007/0255653 A1 | 11/2007 | Fumminaro et al. | |
| 2008/0033825 A1 | 2/2008 | Goldin | |
| 2008/0052229 A1 | 2/2008 | Sheinker et al. | |
| 2008/0086410 A1 | 4/2008 | MacGuire | |
| 2008/0195534 A1 | 8/2008 | Landis et al. | |
| 2009/0006249 A1 | 1/2009 | Morgan et al. | |
| 2009/0043697 A1 | 2/2009 | Jacobs et al. | |
| 2009/0048884 A1* | 2/2009 | Olives | G06Q 40/00 705/40 |
| 2009/0187482 A1 | 7/2009 | Blount et al. | |
| 2010/0017324 A1 | 1/2010 | Brownhill et al. | |
| 2010/0223154 A1 | 9/2010 | Frohwein et al. | |
| 2010/0228651 A1 | 9/2010 | Becerra et al. | |
| 2010/0299251 A1 | 11/2010 | Thomas | |
| 2010/0306071 A1 | 12/2010 | Kay | |
| 2011/0166987 A1 | 7/2011 | Hu et al. | |
| 2011/0191173 A1 | 8/2011 | Blackhurst et al. | |
| 2011/0191239 A1 | 8/2011 | Blackhurst et al. | |
| 2011/0251870 A1 | 10/2011 | Tavares et al. | |
| 2012/0022945 A1 | 1/2012 | Falkenborg et al. | |
| 2012/0054097 A1* | 3/2012 | Frohwein | G06Q 20/102 705/40 |
| 2012/0066033 A1* | 3/2012 | Frohwein | G06Q 30/0207 705/14.1 |
| 2012/0089436 A1 | 4/2012 | Tavares et al. | |
| 2012/0173416 A1 | 7/2012 | Bayne | |
| 2012/0209734 A1 | 8/2012 | Brooks et al. | |
| 2012/0233010 A1 | 9/2012 | Frohwein et al. | |
| 2012/0233090 A1 | 9/2012 | Tavares et al. | |
| 2012/0239552 A1 | 9/2012 | Harycki | |
| 2012/0271765 A1 | 10/2012 | Cervenka et al. | |
| 2013/0085804 A1 | 4/2013 | Left et al. | |
| 2013/0138544 A1 | 5/2013 | Chapman | |
| 2013/0211892 A1 | 8/2013 | Frohwein et al. | |
| 2013/0268417 A1 | 10/2013 | Sgueglia | |
| 2014/0006202 A1* | 1/2014 | Frohwein | G06Q 40/025 705/26.3 |
| 2014/0025525 A1* | 1/2014 | Frohwein | G06Q 30/08 705/26.3 |
| 2014/0058804 A1 | 2/2014 | Zhou et al. | |
| 2014/0067677 A1 | 3/2014 | Ali et al. | |
| 2014/0143405 A1 | 5/2014 | Pavlidis et al. | |
| 2014/0244361 A1 | 8/2014 | Zhang et al. | |
| 2014/0244479 A1 | 8/2014 | White et al. | |
| 2014/0245210 A1 | 8/2014 | Battcher et al. | |
| 2014/0358766 A1* | 12/2014 | Nayyar | G06Q 40/025 705/38 |
| 2015/0026035 A1 | 1/2015 | Showalter | |
| 2015/0095210 A1* | 4/2015 | Grech | G06Q 40/025 705/38 |
| 2015/0149333 A1 | 5/2015 | Yaplee et al. | |
| 2015/0161606 A1 | 6/2015 | Lee | |
| 2015/0168478 A1 | 6/2015 | Ohlen et al. | |
| 2015/0254768 A1 | 9/2015 | Menon et al. | |
| 2015/0269578 A1 | 9/2015 | Subramanian et al. | |
| 2016/0019614 A1 | 1/2016 | Dziuk | |
| 2016/0055427 A1 | 2/2016 | Adjauote | |
| 2016/0210634 A1 | 7/2016 | Trujillo | |
| 2017/0213282 A1 | 7/2017 | Dziuk | |
| 2018/0211212 A1* | 7/2018 | Chin | G06Q 10/087 |
| 2020/0219102 A1* | 7/2020 | Varma | G06Q 20/386 |

OTHER PUBLICATIONS

Oracle, "Oracle Retail Advanced Inventory Planning" (Year: 2013).*

"Oracle Retail Advanced Inventory Planning," www.oracle.com, pp. 1-2 (2013).

Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.

Comptroller's Handbook, "Accounts Receivable and Inventory Financing," Comptroller of the Currency Administrator of National Banks, published Mar. 2000, pp. 1-78.

Giusti, A.C., "Want More Revenue? Enhance the Offers: Carefully matching merchants with the right products and ensuring agents know them well can dictate how much an ISO may earn from value-added services," ISO & Agent 7.4, dated May 1, 2011, pp. 1-2.

Greene, J.H., "Production and Inventory Control Handbook," The McGraw-Hill, Third Edition, pp. 287 (Year: 1997).

Greene, J.H., "Production and Inventory Control Handbook," The McGraw-Hill, Third Edition, pp. 290 (Year: 1997).

Leung, L., "PayPal ramps up small-business loans," The Orange County register, Journal—Gazette [Ft. Wayne, Ind], dated Feb. 10, 2014, pp. 1-2.

Non-Final Office Action dated Jan. 8, 2015, for U.S. Appl. No. 14/491,958, of Poursartip, A., et al., filed Sep. 19, 2014.

Non-Final Office Action dated Mar. 27, 2015, for U.S. Appl. No. 14/491,965, of Poursartip, A., et al., filed Sep. 19, 2014.

Non-Final Office Action dated Mar. 27, 2015, for U.S. Appl. No. 14/491,967, of Poursartip, A., et al., filed Sep. 19, 2014.

Final Office Action dated May 20, 2015, for U.S. Appl. No. 14/491,958, of Poursartip, A., et al., filed Sep. 19, 2014.

Advisory Action dated Jul. 27, 2015, for U.S. Appl. No. 14/491,958, of Poursartip, A., et al., filed Sep. 19, 2014.

Non-Final Office Action dated Aug. 27, 2015, for U.S. Appl. No. 14/540,947, of Baker, G. K., et al., filed Nov. 13, 2014.

Final Office Action dated Oct. 8, 2015, for U.S. Appl. No. 14/491,967, of Poursartip, A., et al., filed Sep. 19, 2014.

Final Office Action dated Nov. 6, 2015, for U.S. Appl. No. 14/491,965, of Poursartip, A., et al., filed Sep. 19, 2014.

(56) References Cited

OTHER PUBLICATIONS

Non-Final Office Action dated Jan. 5, 2016, for U.S. Appl. No. 14/491,958, of Poursartip, A., et al., filed Sep. 19, 2014.
Non-Final Office Action dated Feb. 12, 2016, for U.S. Appl. No. 14/540,947, of Baker, G. K., et al., filed Nov. 13, 2014.
Non-Final Office Action dated Sep. 9, 2016, for U.S. Appl. No. 14/540,947, of Baker, G. K., filed Nov. 13, 2014.
Non-Final Office Action dated May 5, 2016, for U.S. Appl. No. 14/491,967, of Poursartip, A., et al., filed Sep. 19, 2014.
Non-Final Office Action dated Jun. 17, 2016, for U.S. Appl. No. 14/491,965, of Poursartip, A., et al., filed Sep. 19, 2014.
Non-Final Office Action dated Jun. 17, 2016, for U.S. Appl. No. 14/622,605, of Scott, J.B., et al., filed Feb. 13, 2015.
Final Office Action dated Oct. 21, 2016, for U.S. Appl. No. 14/491,967, of Poursartip, A., et al., filed Sep. 19, 2014.
Non-Final Office Action dated Nov. 28, 2016, for U.S. Appl. No. 14/491,963, of Poursartip, A., et al., filed Sep. 19, 2014.
Non-Final Office Action dated Dec. 19, 2016, for U.S. Appl. No. 14/491,965, of Poursartip, A., et al., filed Sep. 19, 2014.
Examiner's Answer to Appeal Brief dated Jan. 27, 2017, for U.S. Appl. No. 14/491,958, of Poursartip, A., et al., filed Sep. 19, 2014.
Non-Final Office Action dated Feb. 10, 2017, for U.S. Appl. No. 14/622,605, of Scott, J.B., et al., filed Feb. 13, 2015.
Notice of Allowance dated Mar. 30, 2017, for U.S. Appl. No. 14/491,967, of Poursartip, A., et al., filed Sep. 19, 2014.
Final Office Action dated Apr. 6, 2017, for U.S. Appl. No. 14/540,947, of Baker, G.K., filed Nov. 13, 2014.
Non-Final Office Action dated May 10, 2017, for U.S. Appl. No. 14/602,486, of Fern, A.J., et al., filed Jan. 22, 2015.
Non-Final Office Action dated May 16, 2017, for U.S. Appl. No. 14/676,678, of Scott, J.B., et al., filed Apr. 1, 2015.
Notice of Allowance dated Jun. 7, 2017, for U.S. Appl. No. 14/491,963, of Poursartip, A., et al., filed Sep. 19, 2014.
Notice of Allowance dated Jun. 22, 2017, for U.S. Appl. No. 14/540,947, of Baker, G.K., filed Nov. 13, 2014.
Final Office Action dated Jul. 27, 2017, for U.S. Appl. No. 14/491,965, of Poursartip, A., et al., filed Sep. 19, 2014.
Notice of Allowance dated Sep. 22, 2017, for U.S. Appl. No. 14/622,605, of Scott, J.B., et al., filed Feb. 13, 2015.
Non-Final Office Action dated Nov. 8, 2017, for U.S. Appl. No. 15/725,591, of Poursartip, A., et al., filed Oct. 5, 2017.
Final Office Action dated Dec. 29, 2017, for U.S. Appl. No. 14/676,678, of Scott, J.B., et al., filed Apr. 1, 2015.
Final Office Action dated Jan. 9, 2018, for U.S. Appl. No. 14/602,486, of Fern, A.J., et al., filed Jan. 22, 2015.
Notice of Allowance dated Jan. 19, 2018, for U.S. Appl. No. 14/491,965, of Poursartip, A., et al., filed Sep. 19, 2014.
Non-Final Office Action dated Mar. 8, 2018, for U.S. Appl. No. 14/522,287, of Cieri, M.M, et al., filed Oct. 23, 2014.
Notice of Allowance dated May 2, 2018, for U.S. Appl. No. 15/725,591, of Poursartip, A., et al., filed Oct. 5, 2017.
Final Office Action dated Oct. 3, 2018, for U.S. Appl. No. 14/522,287, of Cieri, M.M, et al., filed Oct. 23, 2014.
Non-Final Office Action dated Oct. 5, 2018, for U.S. Appl. No. 16/111,278, of Poursartip, A., et al., filed Aug. 24, 2018.
Non-Final Office Action dated Oct. 18, 2018, for U.S. Appl. No. 14/676,678, of Scott, J.B., et al., filed Apr. 1, 2015.
Advisory Action dated Dec. 13, 2018, for U.S. Appl. No. 14/522,287, of Cieri M., M., et al., filed Oct. 23, 2014.
Non Final Office Action dated Jan. 25, 2019, for U.S. Appl. No. 14/602,486, of Fern, A.J., et al., filed Jan. 22, 2015.
Notice of Allowance dated Feb. 21, 2019, for U.S. Appl. No. 16/111,278, of Poursartip, A., et al., filed Aug. 24, 2018.
Non-Final Office Action dated Apr. 5, 2019, for U.S. Appl. No. 14/522,287, of Cieri, M.M., et al., filed Oct. 23, 2014.
Non Final Office Action dated May 31, 2019, for U.S. Appl. No. 15/670,305, of Poursartip, A., et al., filed Aug. 7, 2017.
Notice of Allowance dated Sep. 17, 2020, for U.S. Appl. No. 14/602,486, of Fern A., A. et al., filed Jan. 22, 2015.
Proquest, "Intuit Launches New Personalizable Small Business Channel on Quicken.com Web Site", Business/Technology Editors, Business Wire New York, Jul. 28, 1998, pp. 1-3.
Notice of Allowance dated Jun. 4, 2019, for U.S. Appl. No. 14/491,958, of Poursartip, A., et al., filed Sep. 19, 2014.
Notice of Allowance dated Jun. 12, 2019, for U.S. Appl. No. 14/676,678 of Scott, J.B., et al., filed Apr. 1, 2015.
Final Office Action dated Aug. 2, 2019, for U.S. Appl. No. 14/602,486, of Fern, A.J., et al., filed Jan. 22, 2015.
Notice of Allowance dated Sep. 30, 2019, for U.S. Appl. No. 14/522,287, of Cieri, M.M., et al., filed Oct. 23, 2014.
Notice of Allowance dated Oct. 31, 2019, for U.S. Appl. No. 15/670,305, of Poursartip, A., et al., filed Aug. 7, 2017.
Non-Final Office Action dated Mar. 18, 2020, for U.S. Appl. No. 14/602,486, of Cieri, M.M, et al., filed Oct. 23, 2014.
Non-Final Office Action dated Sep. 29, 2020, for U.S. Appl. No. 16/808,860, of Poursartip, A., et al., filed Mar. 4, 2020.
Pre-Interview First Office Action dated Apr. 5, 2021, for U.S. Appl. No. 16/596,903, of Poursartip, A., et al., filed Oct. 9, 2019.
Notice of Allowance dated Apr. 21, 2021, for U.S. Appl. No. 16/808,860, of Poursartip, A., et al., filed Mar. 4, 2020.
Pre-Interview First Office Action dated Feb. 19, 2021, for U.S. Appl. No. 16/658,198, of Scott, J.B et al., filed Oct. 21, 2019.
Final Office Action dated Mar. 1, 2021, for U.S. Appl. No. 16/808,860, of Poursartip, A., et al., filed Mar. 4, 2020.

* cited by examiner

INVENTORY MANAGEMENT WITH CAPITAL ADVANCE

PRIORITY

This application is a continuation of, and claims priority to, U.S. patent application Ser. No. 14/522,287, filed on Oct. 23, 2014, entitled "Inventory Management With Capital Advance", which issued as U.S. Pat. No. 10,565,642, on Feb. 18, 2020, and is fully incorporated by reference herein.

BACKGROUND

Many merchants conduct transactions with buyers for various types of goods and services. These merchants often attempt to maintain certain levels of inventory so that the merchants may provide an item to a buyer when purchased. For example, a merchant may order additional inventory for an item when the merchant notices that the inventory is getting relatively low. However, such merchants often receive shipments of additional inventory after the additional inventory is needed. In order to avoid this problem, some merchants maintain a relatively large inventory of an item. However, maintaining a large inventory is expensive and may prevent the merchant from making other business purchases, such as new equipment, marketing materials, rental space and so on.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
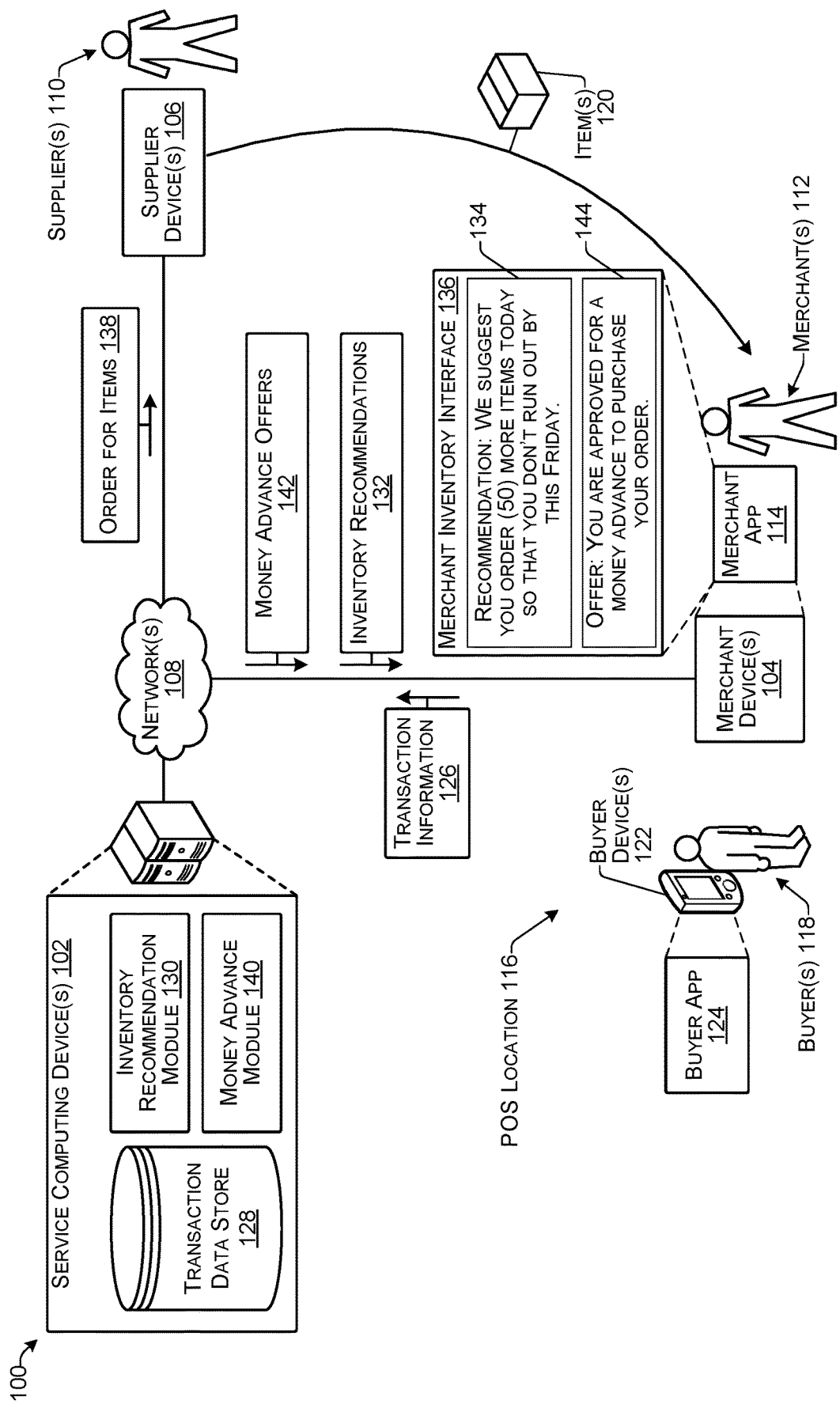
FIG. 1 illustrates an example environment for a recommendation and money advance service according to some implementations.

Some implementations described herein include techniques and arrangements for managing inventory of items by providing recommendations to merchants for ordering inventory and offering money advances to make the orders. The recommendations and money advances may consider sales information from point of sale (POS) devices, shipping information, current inventory, future demand for items and a variety of other information. The recommendations may indicate when to order additional inventory, how much inventory to order and so on. The money advances may provide means for purchasing additional inventory and/or paying other expenses. The money advances may be provided when a risk associated with advancing money is within a particular threshold level, to avoid advancing money to merchants that cannot make payments. The risk of advancing money may be based on item sales for the merchants. The recommendations and money advances discussed herein may assist merchants in maintaining adequate inventory without overstocking items.

In some instances, a service provider may collect and analyze transaction information to provide recommendations for ordering inventory. The transaction information may include sales information for financial transactions of goods and/or services (referred to herein as items) that are conducted between merchants and buyers (e.g., customers), such as at a POS location. The service provider may analyze the transaction information to determine a sales rate of an item (e.g., a number of items that are sold over a time period). The service provider may use the sales rate to predict when a current inventory of an item for a merchant will reach a particular lower limit. The service provider may then provide a recommendation to order more inventory of the item before the inventory reaches the particular lower limit. Further, the recommendation may suggest a quantity of the item to order from the sales rate of the item (e.g., suggest an expected sales quantity of the item over a future time period). In response to receiving input from the merchant, the service provider may, in some instances, order the inventory from a supplier on behalf of the merchant. As such, the service provider may facilitate the purchase of additional inventory for the merchant.

As one example, suppose that transaction information for a merchant shows that baseball bats sell at a rate of ten bats per week. Also, suppose that the merchant's current inventory of baseball bats is twenty-five. Here, the service provider may determine that the merchant has less than three weeks before the inventory of baseball bats is gone. Thus, the service provider may send a recommendation to the merchant in advance of this date to suggest that the merchant purchase additional baseball bats. Further, the recommendation may suggest, based on the sales rate of baseball bats, that the merchant order thirty baseball bats so that the merchant can maintain three weeks of inventory. In response to receiving the recommendation, the merchant may provide input indicating a desire to have the service provider order thirty baseball bats. The service provider may receive the input from the merchant and order the baseball bats on behalf of the merchant.

In some instances, the service provider may consider transaction information for merchants that are associated with a same merchant category as a merchant that is receiving a recommendation. As one example, merchants may be associated with a same merchant category when the merchants offer the same category of items for acquisition. The service provider may use the transaction information for merchants in the same category to, for example, determine a sales rate of an item across multiple merchants and/or provide a recommendation for ordering inventory. In returning to the example above, the service provider may provide a recommendation regarding inventory of baseball bats based on sales rates of other similar merchants, such as other merchants that sell sporting equipment. As such, the recommendation to the baseball bat merchant may suggest a quantity of baseball bats to order from the sales rate of baseball bats for the other merchants that sell sporting equipment.

The service provider may additionally, or alternatively, account for other types of information to provide recommendations regarding inventory. For example, the service provider may consider past delivery times of items from suppliers. The past delivery times may be with respect to a merchant that is receiving a recommendation, other merchants in a same merchant category or a variety of other merchants. In the baseball bat example discussed above, the service provider may determine, from previous deliveries times to a particular merchant or other merchants that sell sporting goods, that baseball bats generally take two weeks to arrive from the date of purchase. Accordingly, the service provider may recommend ordering baseball bats two weeks in advance of inventory of the baseball bats reaching a particular lower limit. This may allow adequate time for the baseball bats to arrive from a supplier and avoid inventory of the baseball bats running out.

As noted above, the service provider may also provide money advances to merchants to purchase inventory and/or pay other expenses. A money advance (sometimes referred to as a "cash advance") may include providing money to a merchant in return for payment from the merchant over time for the original amount that is advanced as well as an additional amount. In some instances, the merchant may pay a money advance back from a portion of sales. That is, the money advance may be associated with sales of the merchant. As one example, suppose that the service provider determines to offer $5,000 to a merchant to acquire additional inventory of a particular item. The service provider may advance the $5,000 to the merchant in return for 10% of the merchant's daily revenue. The service provider may collect the portion of the merchant's daily revenue until the merchant has paid back the money advance and an additional amount, such as $5,500 in total. As such, the money advance may not be associated with a predetermined payback period (e.g., each payment amount may vary and the time period to completely payback the advance may vary).

The service provider may determine whether to offer a money advance to a merchant based on transaction information for the merchant. The transaction information may indicate sales of the merchant over a past time period. The service provider may determine a risk associated with advancing money to the merchant based on sales of the merchant over the past time period. In one example, a merchant that has sold a relatively high quantity of items over a particular period of time may be associated with a relatively low level of risk, since the sales quantity indicates that the merchant will likely be able to payback a money advance. In contrast, a merchant that has sold relatively few items over the same period of time may be associated with a relatively high level of risk for a money advance. Further, in some instances the risk associated with advancing money may be determined from an amount of profit from sales. As one example, the service provider may determine a relatively high level of risk for advancing money when the profit for an item sold by a merchant is relatively low and may determine a relatively low level of risk when profits are relatively high. Moreover, in yet further instances the risk of advancing money may be determined from a portion of the money advance that will be used for purchasing inventory. As one example, the service provider may determine a relatively high level of risk for a merchant that chooses to use a relatively small portion of the money advance to purchase inventory.

In some instances, the service provider may offer a money advance with a restriction placed on the use of the money. The restriction may require that the merchant use at least a particular portion of the money for purchasing inventory (e.g., at least 50% of the money), use an entirety of the money to purchase inventory and so on. This may help assure that the service provider is able to collect payment from the merchant for the money advance.

Further, in some instances the service provider may offer the money advance along with a recommendation regarding inventory. The money advance may be for an amount that is needed to place an order for a recommended quantity of inventory. In returning to the example discussed above where the service provider sends a recommendation to a merchant to order thirty baseball bats, the recommendation may also include an offer for the service provider to advance money to order the thirty baseball bats. Upon receiving the recommendation, the merchant may provide input indicating a desire to purchase the thirty baseball bats with the money advance and the service provider may order the thirty baseball bats with the money advance on behalf of the merchant. However, in some instances rather than offering a money advance with a recommendation regarding inventory, the service provider may offer the money advance separately from providing the recommendation.

For discussion purposes, some example implementations are described in the environment of a service computing device that provides recommendations to merchants for ordering inventory and offers money advances to the merchants. However, implementations herein are not limited to the particular examples provided, and may be extended to other environments, other system architectures, other types of merchants and so forth, as will be apparent to those of skill in the art in light of the disclosure herein.

FIG. 1 illustrates an example environment 100 for a recommendation and money advance service according to some implementations. For instance, the environment 100 may enable a service provider to provide recommendations to merchants for ordering inventory and to offer money advances to the merchants to make the orders. In the illustrated example, one or more service computing devices 102 (hereinafter "the service computing device 102") of the service provider are able to communicate with one or more merchant devices 104 and/or one or more supplier devices 106 over one or more networks 108. Each supplier device 106 may be associated with a supplier of one or more suppliers 110. Meanwhile, each merchant device 104 may be associated with a merchant of one or more merchants 112. Each merchant device 104 may include an instance of a merchant application 114 that executes on a respective merchant device 104. The merchant application 114 may provide POS functionality to the respective merchant device 104 to enable the respective merchant 112 to accept payments at a POS location 116 from one or more buyers 118 (hereinafter "the buyer 118"). In some types of businesses, the POS location 116 may correspond to a store or other place of business of the merchant, and thus, may be a fixed location that typically does not change on a day-to-day basis. In other types of businesses, however, the POS location 116 may change from time to time, such as in the case that the merchant operates a food truck, is a street vendor, a cab driver, etc. or has an otherwise mobile business (e.g., in the case of merchants who sell items at buyer's homes, places of business and so forth). As illustrated, the one or more suppliers 110 may supply one or more items 120 to the one or more merchants 112, such as items to be stored as inventory and sold to the one or more buyers 118.

A merchant may include any business engaged in the offering of goods or services for acquisition by buyers in exchange for compensation received from the buyers. Actions attributed to a merchant may include actions performed by employees or other agents of the merchant and, thus, no distinction is made herein between merchants and their employees unless specifically discussed. In addition, a buyer may include any entity that acquires goods or services from a merchant, such as by purchasing, renting, leasing, borrowing, licensing or the like. Hereinafter, goods and/or services offered by merchants may be referred to as items. Thus, a merchant and a buyer may interact with each other to conduct a transaction in which the buyer acquires one or more items from a merchant, and in return, the buyer provides payment to the merchant.

A supplier may include any entity engaged in providing items to others. A supplier may generally be involved in moving an item along a supply chain to a customer. For example, a supplier may include a wholesaler, manufacturer, packager, distributor, dealership and so on. Further, in some instances, a merchant may be considered a supplier and vice versa (e.g., the one or more merchants 112 may be the one or more suppliers 110).

In this example, the buyer 118 has one or more buyer devices 122 (hereinafter "the buyer device 122") that may each execute a buyer application 124. For instance, the buyer 118 may carry a buyer device, such as smart phones, tablet computers, wearable computing devices, or the like, as further enumerated elsewhere herein, which may have installed thereon the buyer application 124. The buyer application 124 may include electronic payment capability, which enables the buyer 118 to make a payment to the merchant using the buyer application 124, rather than paying with a physical payment card, cash, check, etc. The buyer application 124 may further enable the buyer 118 to check in with the merchant (e.g., at the merchant's store or prior to entering the merchant's store, such as to place an order for an item). As one example, the buyer 118 may be able to place an order for an item through the buyer application 124, may skip waiting in a line for ordering items, may pay for the transaction using the buyer application 124 and may proceed directly to an area of the merchant's store to pick up the ordered item.

In the example of FIG. 1, suppose that the buyer 118 is conducting a transaction with the one or more merchants 112 to purchase an item at the POS location 116. The merchant application 114 on the one or more merchant devices 104 may send transaction information 126 to the service computing device 102, and typically, may send the transaction information 126 as the transaction is being conducted at the POS location 116. In many instances, transaction information may be sent to the service computing device 102 by each of the one or more merchant devices 104 as each transaction is conducted at the respective merchant. Of course, in other examples, such as if the merchant is processing transactions offline, transaction information may be sent in a batch at a subsequent point in time or using other suitable techniques. The service computing device 102 may receive the transaction information 126 and may store the transaction information 126 in a transaction data store 128. The transaction information 126 may be stored in association to a merchant and/or a buyer that are involved in the transaction.

The transaction information 126 may include information regarding the time, place and/or the amount of the transaction, information related to the item acquired (e.g., information identifying the item sold), a type of payment being used (e.g., cash, check, payment card, electronic payment, etc.), as well as additional information, such as buyer information. For instance, if a payment card is used, the transaction information 126 can include data stored in the payment card (e.g., Track 1 data (cardholder name, card number and other card information)). In addition, when completing the transaction a buyer may sometimes provide a receipt email address for receiving a receipt through email. Other examples of transaction information 126 that can be captured include item information (e.g., an itemized listing of the items being acquired, the price being paid for each item, descriptors of the items (size, flavor, color, etc.), geolocation data indicating a geographic POS location of a particular transaction, online/offline card data, data describing the merchant (e.g., a merchant identifier, a merchant category code (MCC), etc.), any type of data that is received upon a buyer's authentication into a social network, if any, and various other types of information. As such, the transaction information 126 may include various sales information about an item.

The service computing device 102 may include an inventory recommendation module 130 that performs various operations related to inventory of items. For example, the inventory recommendation module 130 may monitor inventory of the one or more merchants 104 and analyze transaction information, shipping information, future demand for items and a variety of other information to provide inventory recommendations 132 to the one or more merchants 112. The inventory recommendations 132 may suggest to the one or more merchants 112 when to order additional inventory, how much inventory to order and so on. Further, the inventory recommendation module 130 may facilitate orders between merchants and suppliers, such as ordering inventory on behalf of merchants, providing communications about inventory orders between merchants and suppliers and so on.

As noted above, the inventory recommendation module 130 may monitor current inventories of items for the one or more merchants 112. Inventory (sometimes referred to as stock) may include goods or services that a merchant maintains for the purpose of resale or repair. A merchant may include inventory for different items so that the merchant may provide an item to a buyer when purchased. The inventory recommendation module 130 may maintain a list of inventory of an item for a merchant (e.g., a quantity of an item in stock) by receiving information from the one or more merchant devices 104 indicating a quantity of items currently in stock (e.g., upon an initial stocking of the items) and updating the list of inventory as transaction information is received from the one or more merchant devices 104 regarding sales of items.

In some instances, the inventory recommendation module 130 may detect a location of an item, such as a location within a warehouse, a location during delivery and so on. This may allow the inventory recommendation module 130 to automatically monitor inventory of items for a merchant (e.g., automatically determine a quantity of items in a warehouse). As one example, an item or package housing the item may include a tracking component, such as a Radio-Frequency Identification (RFID) sensor (tag), BLU-ETOOTH® Low Energy (BLE) sensor, barcode, Quick Response (QR) code or other marker or component. In some instances, the inventory recommendation module 130 may cause a senor (e.g., radio) located at a POS location to communicate with the tracking component to identify a geo-location of the item and/or to determine whether the item is located within communication range (e.g., within the warehouse). The inventory recommendation module 130 may receive an indication of inventory of an item from the sensor at the POS location. If, for example, the tracking component is associated with a package that includes multiple items, the tracking component may inform the sensor of the number of items in the package.

The inventory recommendation module 130 may use information about a current inventory of an item and transaction information to create the inventory recommendations 132. For instance, the inventory recommendation module 130 may analyze transaction information stored in the transaction data store 128 to determine a sales rate of items sold (e.g., a quantity of items that are sold over a time period) with respect to the particular merchant that will receive the recommendation and/or with respect to other merchants in a same merchant category. The inventory recommendation module 130 may use the sales rate to predict when a current inventory of an item will reach a threshold lower limit (e.g., less than a particular quantity of items). In other words, the inventory recommendation module 130 may forecast a future demand for the item to determine when the inventory will reach the threshold lower limit. The inventory recommendation module 130 may then generate the inventory recommendations 132 recommending that additional inventory of the item be ordered before the inventory reaches the threshold lower limit.

Merchants may be associated with a same merchant category when the merchants offer the same category of items for acquisition, use the same business category or merchant category codes (MCC) (which categories may be self-declared), include the same number of employees (e.g., within a particular range), generate a same amount of revenue (e.g., within a particular range), are located in a same location (e.g., within a particular geographical region) or are otherwise classified as the same types of merchants. An MCC is a four-digit number assigned to a business by credit card companies (e.g., AMERICAN EXPRESS®, MASTERCARD®, VISA®) when the business first starts accepting payment cards as a form of payment. The MCC is used to classify the business by the type of goods or services provided by the business.

The inventory recommendation module 130 may additionally, or alternatively, use shipping information to create the inventory recommendations 132. The shipping information may describe delivery times for items (e.g., a number of days for delivery of an item from the date of ordering). The shipping information may be gathered over time as items are shipped and delivered. Further, the shipping information may be obtained from websites or other sources that provide delivery times (e.g., websites of the one or more suppliers 110). In some instances, the inventory recommendation module 130 may track items from order to delivery. As one example, an item or package housing the item may include a tracking component, such as a Radio-Frequency Identification (RFID) sensor (tag), BLUETOOTH® Low Energy (BLE) component, barcode, Quick Response (QR) code or other marker or component, that may identify the item or package being transported from a supplier to a merchant. A reader (e.g., barcode reader), camera, radio or other device may scan the item or package or otherwise communicate to identify a location of the item or package during shipment.

In any event, the inventory recommendation module 130 may use the shipping information to create an inventory recommendation that accounts for delivery times of items with respect to a merchant that is receiving a recommendation, other merchants in a same merchant category or a variety of other merchants. As one example, the inventory recommendation module 130 may determine, from previous deliveries times to a particular merchant, that a particular quantity of items from a particular supplier takes three days to arrive upon ordering. Accordingly, the inventory recommendation module 130 may recommend ordering the particular quantity of items at least three days in advance of inventory of the item reaching a particular lower limit.

In some instances, the inventory recommendations 132 may suggest a quantity of items for a merchant to order. Here, the inventory recommendation module 130 may determine an expected sales quantity of an item that will likely be sold over a future time period (e.g., predict how many items will be sold). Again, the inventory recommendation module 130 may consider future demand for an item. The expected sales quantity may be based on a previous sales rate of the item with respect to a particular merchant that will receive a recommendation and/or with respect to other merchants in a same merchant category to the particular merchant. The expected sales quantity may also be based on a time of the day/week/month/year (e.g., determining a relatively large quantity of sales around the holiday seasons or a particular time of the day based on previous sales). Meanwhile, the future time period over which the expected sales quantity is determined may be based on an amount of time specified by a merchant (e.g., the merchant has indicated a desire to have three weeks worth of inventory), industry information from similar merchants (e.g., merchants in the sporting goods industry generally look to have a month worth of inventory) or other information.

The inventory recommendation module 130 may send the inventory recommendations 132 in electronic communications to the one or more merchant devices 104. The inventory recommendations 132 may assist the one or more merchants 112 in determining when to order additional inventory, how much inventory to order and so on. In some instances, the inventory recommendation module 130 may send an inventory recommendation a predetermined amount of time in advance of when inventory should be ordered or will run out (e.g., send an inventory recommendation two days before the inventory should be ordered, send an inventory recommendation two weeks before the inventory will run out). Alternatively, or additionally, the inventory recommendations 132 may specify a future time to order inventory or a future time when inventory will run out. For example, a merchant may view an interface that lists inventory of the merchant and a date next to each item of when the inventory will run out or when to order additional inventory so that the inventory does not run out.

In any event, the one or more merchants 112 may view the inventory recommendations 132 on respective merchant devices 104. In some instances, the one or more merchants 112 may provide merchant input to order inventory. In response to receiving merchant input from a merchant, the inventory recommendation module 130 may send an order for items 138 to the one or more suppliers 110 on behalf of the merchant (e.g., send a communication to order an expected sales quantity of the item). The one or more suppliers 110 may then provide the one or more items 120 to the one or more merchants 112 (e.g., ship the one or more items 120 in packaged form). In some instances, the one or more suppliers 110 may send a communication back to the service computing device 102, such as an order confirmation or other shipping information. The service computing device 102 may then relay the communication from the one or more suppliers 110 to the one or more merchants 112.

As one example of providing a recommendation in the environment 100 of FIG. 1, suppose that one of the one or more merchants 112 sells twenty-five footballs on average per week and that the merchant's current inventory of footballs is at forty-five. Also, suppose that the merchant has specified a desire to have at least two weeks of inventory on-hand. Here, the inventory recommendation module 130 may generate an inventory recommendation that recommends ordering fifty footballs now so that the merchant may maintain two weeks of inventory over the next two weeks. The inventory recommendation may be presented to the merchant as information 134 in a merchant inventory interface 136. As illustrated, the information 134 recommends that the merchant order fifty more items today so that the merchant's inventory does not run out by this Friday. Further details of an example merchant inventory interface are discussed below in reference to FIG. 6.

The service computing device 102 may also include a money advance module 140 to provide money advances offers 142 to the one or more merchants 112. The money advance module 140 may determine risk associated with advancing money to a merchant and offer a money advance to the merchant when the risk is within a threshold level. The money advance may assist the merchant in purchasing additional inventory, new equipment, marketing materials, rental space and so on. As noted above, a money advance may include providing money to a merchant in return for payment from the merchant over time.

To determine risk associated with advancing money to a merchant, the money advance module 140 may consider transaction information stored in the transaction data store 128. For example, the money advance module 140 may analyze transaction information for a particular merchant to determine a quantity of sales and/or profit for the particular merchant over a past time period. If the quantity of sales and/or profit for the particular merchant is more than a threshold quantity or profit, then the money advance module 140 may determine that the risk associated with advancing money to the particular merchant is within a threshold level (e.g., the particular merchant is likely to pay back the money advance). In some instances, the threshold quantity or profit may be set to averages for other merchants that are in a same merchant category as the particular merchant. An amount of profit that a merchant generates may be specified by the merchant, determined from average profits of merchants in a same category and so on. In one example, the money advance module 140 may determine an amount of profit that a merchant has made over a period of time from an average profit margin for items in a merchant category and a quantity of the items that are sold by the merchant (e.g., multiply the average profit per item to a number of items that the merchant sold).

Further, in some instances the money advance module 140 may determine risk associated advancing money to a merchant based on a portion of a money advance that the merchant will use for purchasing inventory. If, for example, the portion of the money advance to be used for purchasing inventory is relatively large, then the risk may be relatively low. Alternatively, if the portion of the money advance to be used for purchasing inventory is relatively small, then the risk may be relatively high.

As one example of evaluating risk for advancing money, the money advance module 140 determines, from transaction information, that a particular merchant in the sporting goods category sells 1000 sporting good items a week, including footballs, soccer balls, baseball bats and so on. Here, the money advance module 140 also determines that the average number of items that other merchants in the sporting goods category sell is 600 based on transaction information across the other merchants in the sporting goods category. Thus, the money advance module 140 determines that the risk associated with advancing money to the particular merchant is relatively low and is within a threshold level, since the particular merchant sells more items than the average for the sporting goods category.

When the money advance module 140 determines that the risk associated with advancing money to a merchant is within a threshold level, the money advance module 140 may send the money advance offers 142 to the one or more merchant devices 104. The money advance offers 142 may be sent as communications. A communication may include any type of electronic communication. In some instances, a communication includes a text message, email, information presented as a pop-up window or other notification. In the example of FIG. 1, one of the money advance offers 142 is presented to the one or more merchants 112 as information 144 in the merchant inventory interface 136. The information 144 indicates that the one or more merchants 112 are approved for a money advance to purchase additional inventory. In this example, the money advance offer is associated with the recommendation to order fifty more items, however, in other examples the money advance may be independent from an inventory recommendation.

In some instances, the money advance module 140 may cause an amount of money to be advanced to a merchant when a merchant chooses to accept a money advance offer (either through an interface, electronic communication or otherwise). In some examples, the money advance module 140 may send a communication to a computing device associated with a bank to cause money (or a digital currency) to be transferred from a financial account associated with the service provider to a financial account associated with the merchant. In other examples, the money advance module 140 may credit money to a user account of a merchant to allow the merchant to make business purchases, such as purchase additional inventory from a supplier that accepts money from user accounts of the service provider (e.g., the supplier may also be a merchant that uses the service provider). In yet further examples, the money advance module 140 may order inventory from the one or more suppliers 110 on behalf of the merchant. Here, the money advance module 140 may cause money to be transferred to a financial account associated with the one or more suppliers 110. The money may be transferred when the order for items 138 is sent to the one or more supplier devices 106.

In other instances, the money advance module 140 may cause an amount of money to be advanced to a merchant automatically when the merchant's funds reach a particular level. For example, a merchant may specify a desire to receive an automatic advance when the money advance module 140 determines that a time period between a current time and a predicted time when the merchant's inventory reaches a threshold lower limit is less than a threshold time period. To illustrate, suppose that a merchant has indicated an interest in automatically ordering additional footballs with a cash advance two weeks before the merchant's inventory of footballs reaches a threshold lower limit of twenty footballs. As such, when the money advance module 140 determines that the merchants football inventory will be below twenty footballs in two weeks, the money advance module 140 may automatically advance money to the merchant (as long as the risk for advancing the money is within the threshold level) and order additional football inventory on behalf of the merchant with the money advance.

In some implementations, the money advance module 140 imposes restrictions on the use of a money advance. The restriction may require that at least a particular portion of the money that is advanced be used to purchase additional inventory for the merchant (e.g., at least 60% of the money be used to buy inventory). Alternatively, or additionally, the restriction may require that an entirety of the money that is advanced be used to purchase additional inventory for the merchant. Further, other restrictions may also be placed on the money, such as a time period for paying back the money, etc.

As noted above, a money advance may obligate a receiving merchant to pay back money. In some instances, the merchant may pay back the money advance from a portion of sales (e.g., pay a particular percentage of daily/weekly/monthly/etc. revenue). Here, the money advance module 140 may monitory transaction information for the merchant to determine sales of the merchant and an amount that is owed to the service provider due to the sales. The money advance module 140 may cause payment to be collected from the merchant on a periodic basis, such as daily, weekly, monthly or yearly.

Figure 2:
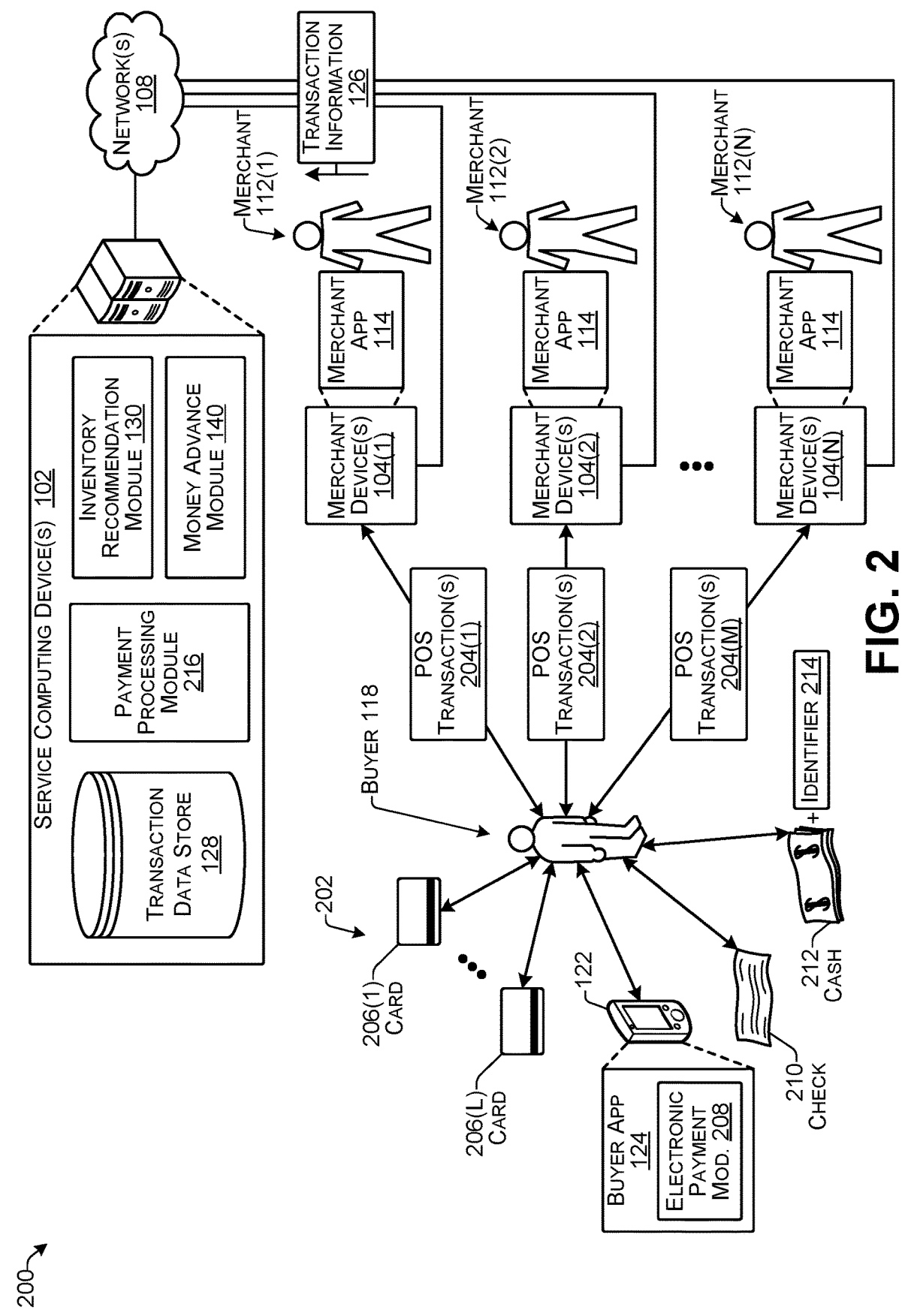
FIG. 2 illustrates an example environment for enabling transactions between merchants and buyers according to some implementations.

FIG. 2 illustrates an example environment 200 for enabling transactions between merchants and buyers according to some implementations. In this example, a buyer 118 may use any of a variety of different payment instruments 202 when participating in a plurality of POS transactions 204(1)-204(M) with a plurality of different merchants 112(1)-108(N). For example, the buyer 118 may typically have a plurality of payment cards 206(1)-206(L), such as credit cards, debit cards, prepaid cards and so forth, that the buyer 118 may use for conducting various different POS transactions 204. Further, in some examples, the payment cards 206 may include one or more magnetic strips for providing card and buyer information when swiped in a card reader. In other examples, other types of payment cards 206 may be used, such as smart cards having a built-in memory chip, a Radio Frequency Identification (RFID) tag and so forth.

The buyer 118 may select a particular payment card 206 for use at a particular POS location and/or for use with a particular merchant 112 for any of a variety of different reasons and may often use different payment cards. For example, the buyer 118 may not always use the same payment card 206 with the same merchant 112 for every POS transaction 204 conducted with that merchant 112. In such scenarios, the transaction information that describes transactions that are conducted using a first payment instruments 202 may be separate or disconnected from the transaction information 126 that describes other transactions conducted using a second payment instrument 202.

In addition to payment cards, the buyer 118 may carry the buyer device 122, as discussed above. The buyer device 122 may include the buyer application 124, which enables an associated electronic payment account to be used as the payment instrument 202. For example, the buyer application 124 may include an electronic payment module 208 that uses an electronic payment account of the buyer 118 for making electronic payments for transactions. In some cases, the electronic payment account of the buyer 118 may be linked to one of the buyer's payment cards 206, such as a credit card. Accordingly, the buyer application 124 may enable the buyer 118 to pay for a transaction with the linked credit card without having to produce the credit card, thereby enabling a card-less payment to the merchant with the credit card. The buyer application 124 and the corresponding electronic payment account, can be associated with various buyer information including, for example, the buyer's name, information describing the payment card linked to the electronic payment account and an email address linked to the electronic payment account to which receipts can be sent for electronic payment transactions that are conducted by the buyer 118 using the buyer application 124. Further, as an alternative to linking the electronic payment account to a credit card, the electronic payment account may be a different type of account, such as a checking account, a debit account, a savings account, a prepaid account having a prepaid quantity of money deposited therein or the like.

In addition to the above discussed payment instruments 202, the buyer 118 may also optionally pay with a check 210 or cash 212. For example, if the buyer 118 pays with the check 210 or cash 212, the merchant may sometimes also receive an identifier 214 that provides additional identification information about the buyer 118. For instance, a merchant may have a club card or other incentive that enables identification of the buyer to the merchant and thereby to the merchant application 114. As an example, the buyer 118 may provide a telephone number associated with the buyer 118, and this telephone number along with other transaction information may be cross-referenced to a matching telephone number in an existing buyer profile to associate the transaction with the buyer 118. Additionally, or alternatively, the buyer 118 may provide an email address in association with a particular transaction to receive a receipt for the transaction by email, rather than receiving a paper receipt, and the email address may be used to associate the transaction with the buyer 118. Alternatively, if the buyer 118 pays with the check 210, the buyer 118 may be required to provide buyer information in association with the check 210, which, in addition to a checking account number, may include telephone number, address, and other identification information. Accordingly, this information may also be associated with the particular transaction, and may thereby enable the transaction to be associated with the buyer 118.

The service computing device 102 may include a payment processing module 216 that may receive the transaction information 126 for processing payments made through the merchant application 114 and, in some cases, the buyer application 124. For example, the payment processing module 216 may receive the transaction information 126, such as an amount of the transaction, and may verify that a particular payment card can be used to pay for the transaction, such as by contacting a card clearinghouse computing device or other bank computing device. Furthermore, in some examples, the payment processing module 216 may redirect payment information for transactions to be made using payment cards 206 to a bank computing device (not shown in FIG. 2), while in other examples, the merchant devices 104 may communicate directly with an appropriate bank computing device for approving or denying a transaction using a particular payment card 206 for a particular transaction.

Figure 3:
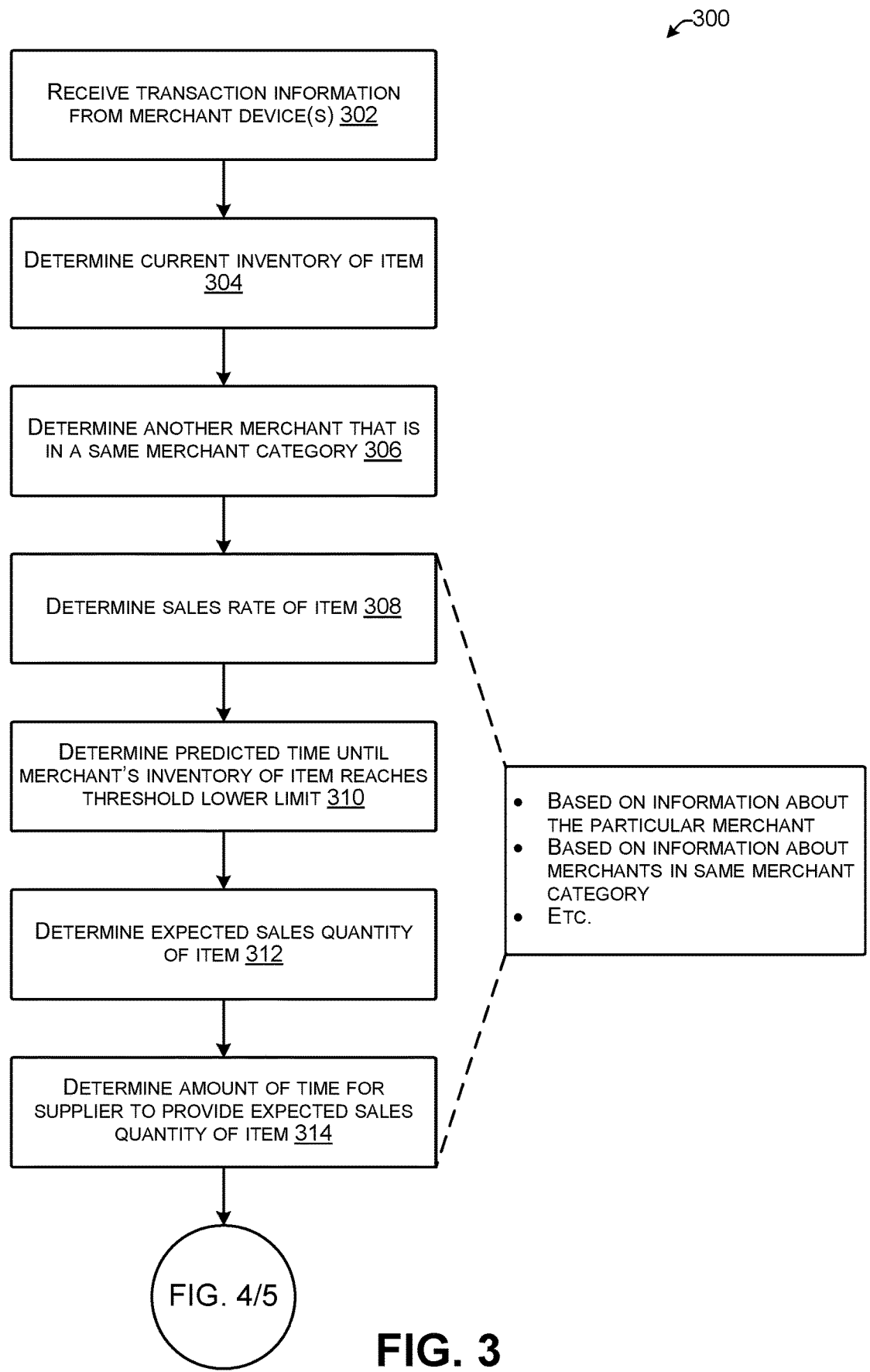
FIG. 3 is a flow diagram illustrating an example process for determining various information for providing recommendations and/or offering money advances according to some implementations.

FIG. 3 is a flow diagram 300 illustrating an example process for determining various information for providing recommendations and/or offering money advances according to some implementations. The process 300 of FIG. 3 and processes 400 and 500 of FIGS. 4 and 5 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. Accordingly, in some implementations, the example processes 300, 400 and 500 of FIGS. 3, 4 and 5 may be executed by one or more processors of the service computing device 102 of the service provider.

In FIG. 3, at 302, the service computing devices 102 may receive (e.g., collect) transaction information from the one or more merchant devices 104 associated with the one or more merchants 112. For example, as discussed above with respect to FIGS. 1 and 2, a plurality of the merchant devices associated with a plurality of different merchants may send transaction information for a plurality of transactions to the service computing device 102. Transaction information may include sales information for an item that is sold by a merchant.

At 304, the service computing device 102 may determine a current inventory of an item for a particular merchant. This may include referencing a list of inventory that is maintained by the service computing device 102 for the item. As discussed above, the list of inventory may be updated as transaction information is received regarding a transaction of the item.

At 306, the service computing device 102 may determine another merchant that is in the same merchant category as the particular merchant. For example, the service computing device 102 may identify another merchant that offers for acquisition a same category of items as the particular merchant, uses the same business category or merchant category codes (MCC) as the particular merchant, includes the same number of employees (e.g., within a particular range) as the particular merchant, generates a same amount of revenue (e.g., within a particular range) as the particular merchant, is located at a same location (e.g., within a particular geographical region) as the particular merchant and so on.

At 308, the service computing device 102 may determine a sales rate of for the item based at least in part on the transaction information. The sales rate may include a quantity of items that have previously been sold over a period of time (e.g., a number of items sold per week). In some instances, the sales rate may include a rate for the particular merchant, while in other instances the sales rate may include a rate for any number of merchants that are in a same merchant category as the particular merchant. Further, in some instances the sales rate is with respect to the particular item for which inventory is being evaluated (e.g., the item for which a recommendation is to be generated), while in other instances the sales rate may be across any type of item.

At 310, the service computing device 102 may determine a predicted time until the merchant's inventory of the item reaches a threshold lower limit (e.g., five items, ten items, zero items, etc.). As such, the service computing device 102 may estimate a time at which the inventory of the item for the particular merchant reaches a threshold lower limit. The threshold lower limit may be specified by the merchant, determined by the service computing device 102 or otherwise determined. The predicted time may be determined based on the current inventory determined at 304 and/or the sales rate determined at 308. In some instances, the predicted time is based on a sales rate of the particular merchant, while in other instances the predicted time is based on a sales rate for merchants that are in a same merchant category.

At 312, the service computing device 102 may determine an expected sales quantity of an item over a future time period. The expected sales quantity may be based on the sales rate determined at 308, a time of day/week/month/year of the future time period and so on. Again, in some instances the sales rate may include a rate for the particular merchant, while in other instances the sales rate may include a rate for any number of merchants that are in a same merchant category as the particular merchant.

At 314, the service computing device 102 may determine an amount of time for a supplier to provide the expected sales quantity of the item. The amount of time may be determined based on past delivery times of the item to the particular merchant, past delivery times of the item to the other merchants in the same merchant category, delivery times specified by a supplier (e.g., times on a supplier's website) and so on.

Figure 4:
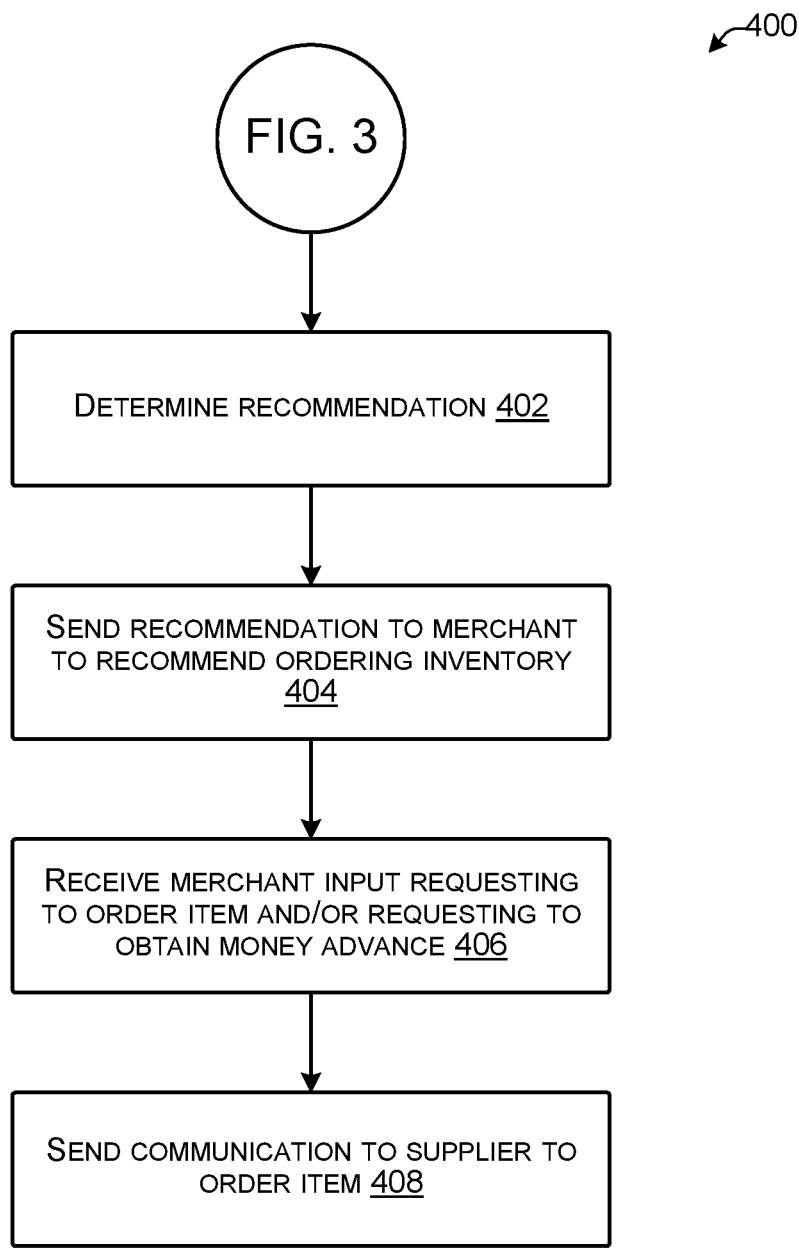
FIG. 4 is a flow diagram illustrating an example process for providing a recommendation regarding inventory of an item.

FIG. 4 illustrates the example process 400 for providing a recommendation regarding inventory of an item. In some instances, the process 400 is performed after the process 300 of FIG. 3, while in other instances the process 400 may be performed in other contexts.

At 402, the service computing device 102 may determine (or generate) a recommendation for ordering inventory of an item. The recommendation may be determined based on a current inventory of the item for a particular merchant, a predicted time until the merchant's inventory reaches a threshold lower limit, transaction information for the particular merchant or at least one other merchant that is in same merchant category (e.g., sales rates), a delivery time for delivering the item, an expected sales quantity of the item over a future time period and so on. In some instances, the recommendation may indicate the expected sales quantity of the item to order for the future time period, a time at which to place the order or other information. Further, in some instance the recommendation may include an offer to provide a money advance to the merchant. As noted above, the money advance may be provided in return for a percentage of payment of items that are sold by the merchant.

At 404, the service computing device 102 may send the recommendation to one of the one or more merchant devices 104 to recommend ordering inventory for an item. This may include making the recommendation available to a merchant via an interface provided on the merchant device. The recommendation may be sent to a merchant device via a communication.

At 406, the service computing device 102 may receive merchant input requesting to order inventory for the item. The merchant input may request to order an expected sales quantity that is recommended in the recommendation. In some instances, the merchant input may also request to obtain a money advance from the service provider to pay for the inventory order.

At 408, the service computing device 102 may send a communication to a supplier to order a quantity of the item for the merchant. The operation 408 may be performed in response to receiving the merchant input at 406. In some instances at 408, the service computing device 102 may also cause at least a portion of a money advance for the merchant to be provided to the supplier for purchasing the quantity of the item. The service computing device 102 may additionally, or alternatively, provide a portion of the money advance to the merchant.

Figure 5:
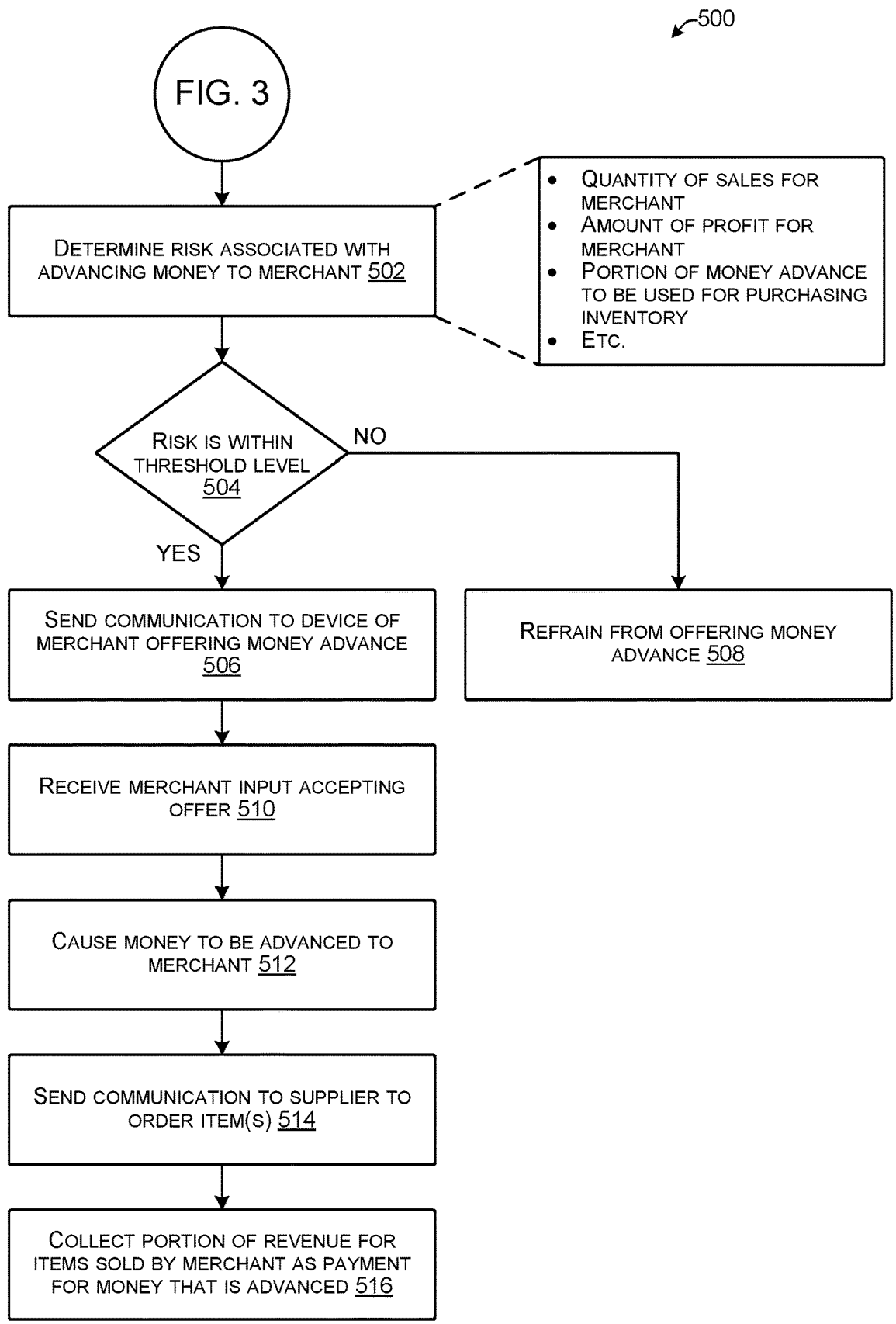
FIG. 5 is a flow diagram illustrating an example process for determining whether to provide a money advance to a merchant.

FIG. 5 illustrates the example process 500 for determining whether or not to provide a money advance to a merchant. In some instances, the process 500 is performed after the process 300 of FIG. 3, while in other instances the process 500 may be performed in other contexts.

At 502, the service computing device 102 may determine risk associated with advancing money to a merchant. In some instances, this may include determining a level of risk. The risk may be determined based on a quantity of sales for the merchant (with respect to a particular item or any number of items that are sold) over a past time period, an amount of profit for the merchant (for a particular item that is sold or for any number of items that are sold) over a past time period, a portion of a money advance that the merchant will use for purchasing inventory and so on. In some instances, the risk may be inversely proportional to a quantity of sales for the merchant, an amount of profit for the merchant and/or a portion of a money advance that will be used for purchasing inventory (e.g., the risk decreases as the number of sales increases, as the amount of profit increases, and/or as the portion of the money advance that will be used for purchasing inventory increases).

At 504, the service computing device 102 may determine whether the risk is within a threshold level. This may include comparing the risk to one or more thresholds. In one example where the risk is based on a quantity of sales, the risk may be compared to a quantity threshold set to an average quantity of sales for other merchants in a same merchant category over a period of time. If the quantity of sales is greater than the quantity threshold, then the risk may be within the threshold level. In another example where the risk is based on an amount of profit, the risk may be compared to a profit threshold that is set to an average profit for other merchants in the same merchant category over a period of time. If the amount of profit is greater than the profit threshold, then the risk may be within the threshold level. In yet another example where the risk is based on a portion of the money advance to be used for purchasing inventory, if the portion of money advance to be used for purchasing inventory is greater than a threshold, then the risk may be within the threshold level.

If the service computing device 102 determines that the risk is within the threshold level, then the process 500 may proceed to 506 and send a communication to one of the one or more merchant devices 104 offering a money advance. Alternatively, if the service computing device 102 determines that the risk is not within the threshold level, then the process 500 may proceed to 508 and refrain from offering a money advance.

At 510, the service computing device 102 may receive merchant input from the merchant device accepting the offer for the money advance. In some instances, the merchant input is receive via an interface, such as the interface of FIG. 6, while in other instances the merchant input is received through a communication, such as a text message, email, etc.

At 512, the service computing device 102 may cause money to be advanced to a merchant. The money may be advanced to the merchant in response to receiving the merchant input at 510. Alternatively, the money may be advanced to the merchant automatically upon determining that a time period between a current time and a predicted time when the merchant's inventory of the particular item reaches threshold lower limit is less than a threshold time period. In some instances, the money may be transferred to an account associated with the merchant, while in other instances the money may be transferred to an account of a supplier to purchase additional inventory on behalf of the merchant. Further, in some instances the service computing device 102 may impose a restriction on use of the money advance, such as requiring that at least a particular portion of the money advance be used to purchase additional inventory, requiring that an entirety of the money advance be used to purchase additional inventory and so on.

At 514, the service computing device 102 may send a communication to a supplier to order one or more items (e.g., order additional inventory). In some instances, this may be done along with operation 512. That is, the service computing device 102 may send a communication to the supplier to order one or more items on behalf of the merchant and may provide the money for the order.

At 516, the service computing device 102 may collect a portion of revenue for items sold by the merchant as payment for the money that is advanced. This may include collecting a portion of revenue on a periodic basis, such as collecting a percentage of a daily, weekly, monthly, or yearly revenue on a daily, weekly, monthly, or yearly basis. The portion of revenue may be collected until the money advance is paid back.

Figure 6:
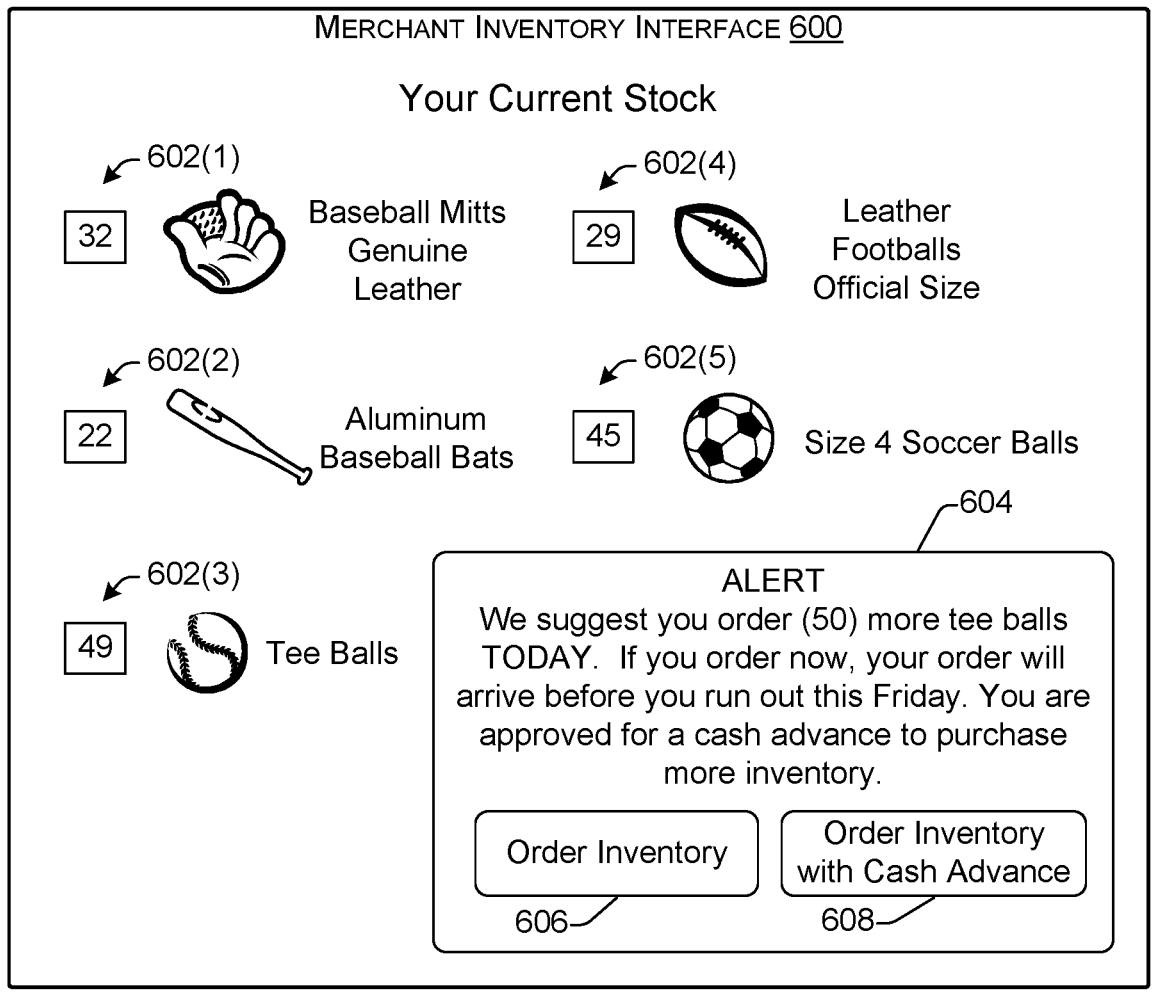
FIG. 6 illustrates an example merchant inventory interface to provide inventory information to a merchant along with an inventory recommendation.

FIG. 6 illustrates an example merchant inventory interface 600 to provide inventory information to a merchant along with an inventory recommendation. The merchant inventory interface 600 may be provided as part of an application (e.g., the merchant application 114), a browser (e.g., a dashboard) or any other interface. As illustrated, the merchant inventory interface 600 displays information about items that are currently offered for acquisition by a merchant. In particular, the merchant inventory interface 600 includes inventory fields 602(1)-(5) illustrates a quantity of respective items that are being offered for acquisition. In this example, the service computing device 102 has determined that the merchant's inventory of tee balls will run out this Friday. Accordingly, the service computing device 102 presents a recommendation 604 to order additional inventory for tee balls. Here, the recommendation 604 suggests that the merchant order fifty tee balls today so that the merchant does not run out of inventory. The recommendation 604 may be based on sales rates of tee balls, delivery times for a typical supplier that the tee balls are ordered from, predicted future demand for the tee balls and so on.

As illustrated, the recommendation 604 also indicates that the merchant is approved for a cash advance to purchase the fifty tee balls. The recommendation 604 includes a button 606 to enable the merchant to provide merchant input to order the inventory with a business account without using the cash advance. The recommendation 604 also includes a button 608 to enable the merchant to provide merchant input to order the inventory with the cash advance. By selecting the button 606 or 608, the service computing device 102 may order the inventory for the merchant (e.g., send a communication to a supplier to order fifty tee balls). In some instances, the merchant may specify a supplier to be utilized upon selecting the button 606 or 608, while in other instances the supplier may be preselected by the service computing device 102, selected from user preferences for the merchant or otherwise determined.

Although not illustrated in FIG. 6, the recommendation 604 may additionally, or alternatively, provide contact information about a supplier, such as a phone number, email address, business address, website link, etc., so that the merchant may contact the supplier directly. The supplier may have registered or otherwise provided contact information to the service provider. Further, although the recommendation 604 is presented as a pop-up window in FIG. 6, the recommendation 604 may be provided in other manners, such as an email, text message, through a telephone call, etc.

Figure 7:
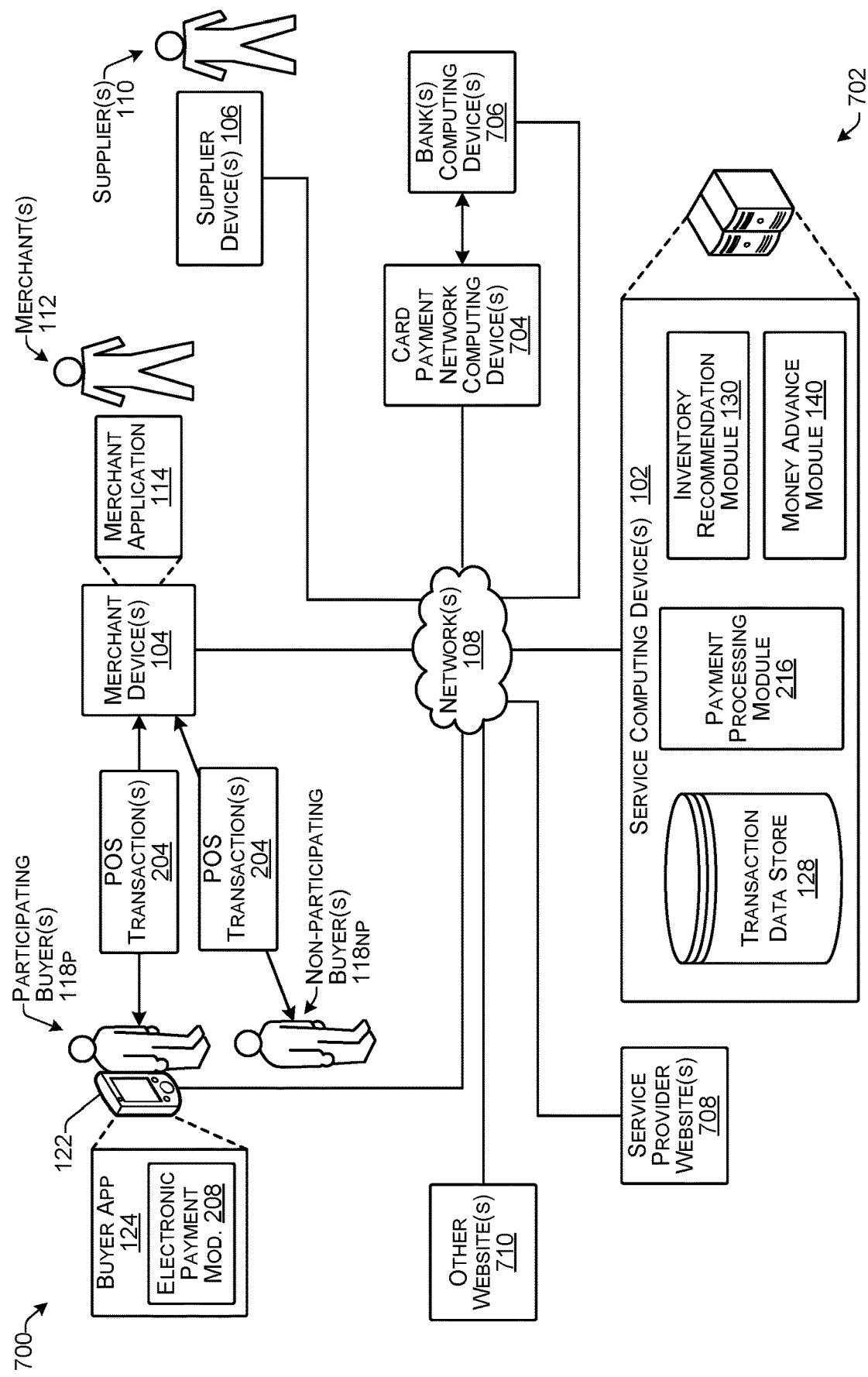
FIG. 7 illustrates an example architecture for a recommendation and money advance system able to provide an inventory recommendation and money advance service according to some implementations.

FIG. 7 illustrates an example architecture for a recommendation and money advance system 700 able to provide an inventory recommendation and money advance service according to some implementations. In the example of FIG. 7, the service computing device 102 of a service provider 702 includes the payment processing module 216, which may be executed to provide payment and transaction functionality, as described herein. The payment processing module 216 and corresponding payment functionality may be implemented as one or more computer programs, or other executable instructions, on the service computing device 102 in one or more locations, such as for providing the payment systems, components and various techniques described herein.

The example of FIG. 7 illustrates at least one buyer device 122 and at least one merchant device 104. For example, each buyer device 122 may be associated with a participating buyer 118*p* that participates in the payment system of the service provider 702. The buyer device 122 may include the buyer application 124, as previously discussed herein, which may include the electronic payment module 208 that provides functionality for enabling the buyer 118*p* to make electronic payments using the buyer device 122. In some examples, the buyer application 124 may include various other applications or modules, such as for a buyer dashboard to enable the buyer to control information in a buyer's profile, set buyer preferences and so forth. Further, the merchant device 104 may be associated with the merchant 112 that participates in the payment service provided by the service provider 702, and the merchant device 104 may include the merchant application 114. Moreover, the supplier device 106 may be associated with the supplier 110. As discussed elsewhere herein, the buyer device 122, the merchant device 104 and/or the supplier device 106 can each be a computing device able to communicate with each other, with the service computing device 102 and with various other computing devices, through any suitable communication protocols, interfaces and networks, including the one or more communication networks 108.

The buyer device 122, the merchant device 104 and/or the supplier device 106 can each include one or more components (e.g., software or hardware) that are configured to respectively determine a geographic location of the buyer device 122, the merchant device 104 and/or the supplier device 106, using, for example, various geolocation techniques (e.g., a global positioning system (GPS), cell tower location, wireless access point location, wireless beacon location and so forth). Further, the buyer device 122, the merchant device 104 and/or the supplier device 106 can each be any appropriate device operable to send and receive requests, messages or other types of information over the one or more networks 108 or directly to each other. Some examples of the buyer device 122, the merchant device 104 and/or the supplier device 106 are enumerated below. Additionally, while only a single buyer device 122, a single merchant device 104 and a single supplier device 106 are illustrated in the example of FIG. 7, in some implementations, there may be thousands, hundreds of thousands, or more, of the buyer devices 118, the merchant devices 104 and the supplier devices 106 depending on the number of the participating buyers 118*p*, the number of merchants 112 and the number of suppliers 110.

The one or more networks 108 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network; or any other such network, or any combination thereof. Accordingly, the one or more networks 108 may include both wired and/or wireless communication technologies, including BLUETOOTH®, BLUETOOTH® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Accordingly, the service computing device 102, the merchant devices 104, the buyer devices 122, the supplier devices 106 and the other computing devices discussed herein are able to communicate over the one or more networks 108 using wired or wireless connections, and combinations thereof.

Additionally, in some examples, information may also be obtained with respect to non-participating buyers 114*np* that do not have an account with the payment service provided through the service computing device 102. The transaction information collected with respect to these buyers may be sent to the service computing device 102. In addition, in some examples, transaction information may be obtained with respect to non-participating merchants (not shown) that do not use a merchant device 104.

When paying for a transaction, the buyer 118 can provide the amount of payment that is due to the merchant 112 using cash, check, a payment card, or by electronic payment using the buyer application 124 on the buyer device 122. The merchant 112 can interact with the merchant device 104 to process the transaction. During POS transactions 204, the merchant device 104 can determine and send data describing the transactions, including, for example, the item(s) being purchased, the amount of the item(s), buyer information and so forth. In some implementations, the service enables card-less payments (e.g., electronic payments, for transactions between the participating buyers 118*p* and the merchants 112 based on interaction of the buyer 118*p* with the buyer application 124 and interaction of the merchant 112 with the merchant application 114). Accordingly, in some examples, a card-less payment transaction may include a transaction conducted between the participating buyer 118*p* and the merchant 112 at a POS location during which an electronic payment account of the buyer 118*p* is charged without the buyer 118*p* having to physically present a payment card to the merchant 112 at the POS location. Consequently, the merchant 112 need not receive any details about the financial account of the buyer 118*p* for the transaction to be processed. As one example, the electronic payment may be charged to a credit card issuer or credit card number that the participating buyer 118*p* provided when signing up with the service provider for the electronic payment account. As another example, the buyer 118p may have a quantity of money pre-paid in an account maintained for use in making the electronic payments. Other variations will also be apparent to those of skill in the art having the benefit of the disclosure herein.

Before conducting an electronic payment transaction, the participating buyer 118p typically creates a user account with service provider of the payment and item recommendation service. The participating buyer 118p can create the user account, for example, by interacting with the buyer application 124 that is configured to perform electronic payment transactions and that may execute on the buyer device 122. When creating a buyer electronic payment account with the payment service, the participating buyer 118p may provide an image including the face of the buyer, data describing a financial account of the buyer 118p (e.g., a credit card number, expiration date and a billing address). This user information can be securely stored by the service provider, such as in a secure database.

To accept electronic payments for POS transactions, the merchant 112 typically creates a merchant account with the service provider 702 by providing information describing the merchant including, for example, a merchant name, contact information (e.g., telephone numbers, the merchant's geographic location address and one or more financial accounts to which funds collected from buyers will be deposited). This merchant information can be securely stored by the service provider 702, such as in a secure database.

The service provider 702 is configured to enable electronic payments for transactions. The service provider 702 can include one or more servers that are configured to perform securely electronic financial transactions (e.g., electronic payments for transactions between a buyer and a merchant), for example, through data communicated between the buyer device 122 and the merchant device 104. Generally, when a buyer and a merchant enter into an electronic payment transaction, the transaction is processed by electronically transferring funds from a financial account associated with the user account to a financial account associated with the merchant account.

In some embodiments, the recommendation and money advance system 700 is configured to determine whether a geographic location of the buyer device 122 is within a threshold geographic distance from a geographic location of the merchant device 104. The recommendation and money advance system 700 can determine a geographic location of the buyer device 122 using, for example, geolocation data provided by the buyer device 122. Similarly, the recommendation and money advance system 700 can determine a geographic location of the merchant device 104 using, for example, geolocation data provided by the merchant device 104 or using a geographic address (e.g., street address, provided by the merchant). Depending on the implementation, the threshold geographic distance can be specified by the recommendation and money advance system 700, by the buyer, or by the merchant.

Determining whether the buyer device 122 is within a threshold geographic distance of the merchant device 104 can be accomplished in different ways including, for example, determining whether the buyer device 122 is within a threshold geographic radius of the merchant device 104, determining whether the buyer device 122 is within a particular geofence or determining whether the buyer device 122 can communicate with the merchant device 104 using a specified wireless technology (e.g., BLUETOOTH® or BLUETOOTH® low energy (BLE)). In some embodiments, the recommendation and money advance system 700 restricts electronic payment transactions between the participating buyer 118p and the merchant 112 to situations where the geographic location of the buyer device 122 is within a threshold geographic distance from a geographic location of the merchant device 104.

The recommendation and money advance system 700 can also be configured to communicate with one or more computing devices 704 of a card payment network (e.g., MASTERCARD®, VISA®) over the one or more networks 108 to conduct financial transactions electronically. The recommendation and money advance system 700 can also communicate with one or more bank computing devices 706 of one or more banks over the one or more networks 108. For example, the recommendation and money advance system 700 may communicate with an acquiring bank, an issuing bank and/or a bank maintaining buyer accounts for electronic payments.

An acquiring bank may be a registered member of a card association (e.g., VISA®, MASTERCARD®), and may be part of a card payment network. An issuing bank may issue payment cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the buyer may use a debit card instead of a credit card, in which case, the bank computing device(s) of a bank corresponding to the debit card may receive communications regarding a transaction in which the buyer is participating. Additionally, there may be computing devices of other financial institutions involved in some types of transactions or in alternative system architectures, and thus, the foregoing are merely several examples for discussion purposes.

The participating buyer 118p operating the buyer device 122 that is within a threshold geographic distance of the merchant device 104 can interact with the buyer application 124 executed on the buyer device 118 to conduct an electronic payment transaction with the merchant 112. While interacting with the buyer application 124, the buyer 118p can select the merchant 112, from a listing of merchants 112, with whom the buyer 118p wants to enter into an electronic payment transaction. The buyer 118p can select the merchant 112, for example, by selecting a "check in" option associated with the merchant 112. The buyer device 122 can communicate data to the recommendation and money advance system 700 indicating that the buyer 118p has checked in with the merchant 112. In response, the recommendation and money advance system 700 can communicate data to notify the merchant device 104 that the buyer has checked in. The merchant application 114 executing on the merchant device 104 can notify the merchant 112 that the buyer has electronically checked in with the merchant 112 through a display screen of the merchant device 104.

Once checked in, the buyer 118p can obtain, or request, items that are available to be acquired from the merchant 112. When the buyer 118p is ready to enter into the card-less payment transaction, the buyer 118p can, for example, approach a point of sale for the merchant 112 and identify him or herself. For example, the buyer 118p can verbally notify the merchant 112 that the buyer 118p wants to enter into a card-less payment transaction and can provide the merchant 112 with the buyer's name. The merchant 112 can then interact with the merchant application 114 to select the buyer 118p, from a listing of buyers that have checked in with the merchant 112, to initiate an electronic payment transaction for the item(s) being acquired by the buyer 118*p*. For example, the merchant 112 can determine a total amount to charge the buyer 118*p* for the item(s) being acquired. The buyer 118*p* can verbally approve the total amount to be paid and, in response, the merchant 112 can submit a request for an electronic payment transaction for the total amount of the transaction to the recommendation and money advance system 700. In response, the recommendation and money advance system 700 can obtain data describing a financial account associated with the electronic purchase account of the buyer 118*p* to which the total amount will be charged.

The recommendation and money advance system 700 can then communicate with the computing device 102 of a card payment network to complete an electronic payment transaction for the total amount to be charged to the buyer's electronic payment account. Once the electronic payment transaction is complete, the recommendation and money advance system 700 can communicate data describing the electronic payment for the transaction to the buyer device 122 (e.g., as an electronic receipt, which can, for example, notify the buyer 118*p* of the total amount charged to the buyer for the electronic payment for the transaction with the particular merchant). Further, while a mobile buyer device 122 is described in this example for purposes of explanation, additional or alternative types of devices may be used in other examples.

In addition, in some examples, the service provider 702 may make available one or more service provider websites 708 that enable the merchants 112 to advertise items on the service provider website(s). For example, the merchants 112 may offer items for purchase to buyers on the website. The buyers may purchase the items using a web browser, or other application on a computing device, such as the buyer device 122 or other computing device. The transaction information from these transactions may be provided to the service computing device 102.

Figure 8:
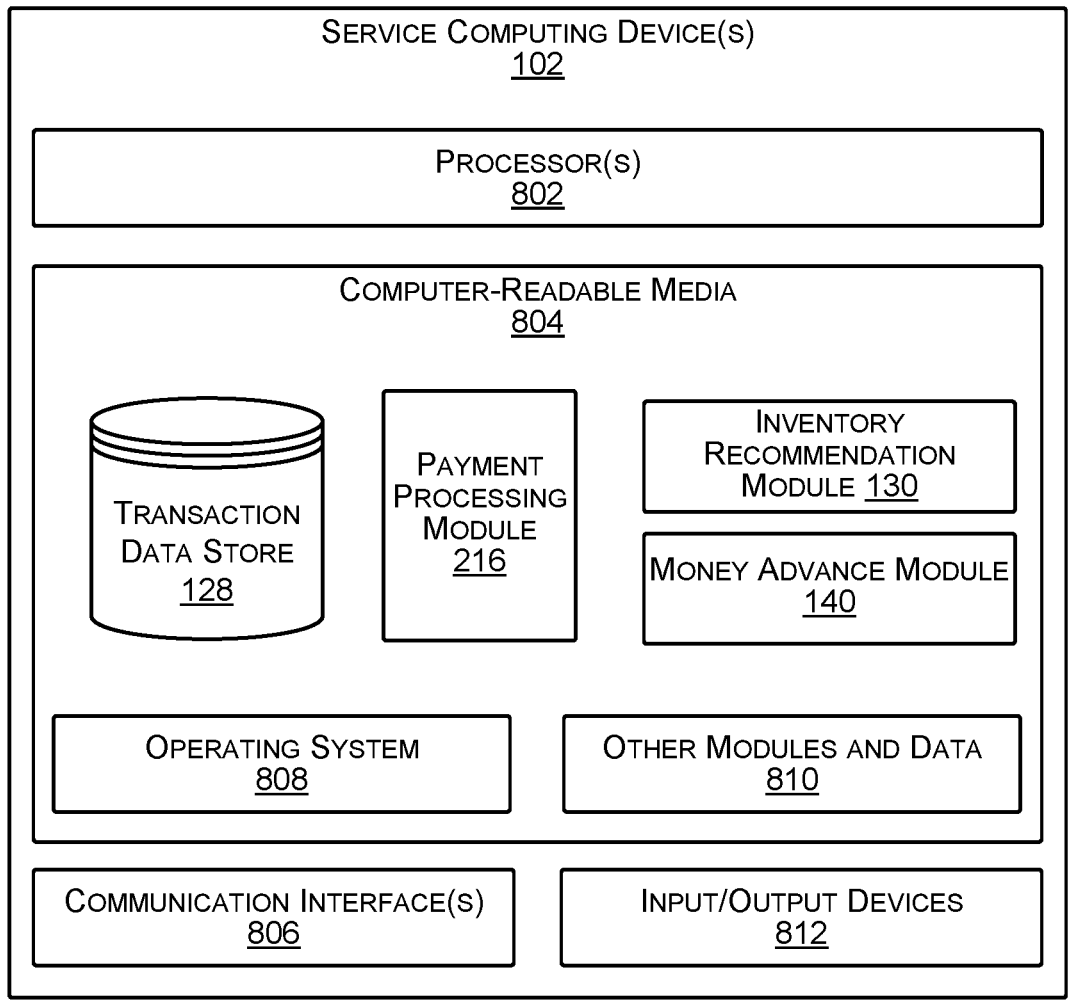
FIG. 8 illustrates select example components of a service computing device that may be used to implement some functionality of the inventory recommendation and money advance service described herein.

FIG. 8 illustrates select components of the service computing device 102 that may be used to implement some functionality of the inventory recommendation and money advance service described herein. The service computing device 102 may be operated by a service provider that provides the inventory recommendation and money advance service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 102 may include one or more processors 802, one or more computer-readable media 804, one or more communication interfaces 806 and one or more input/output devices 812. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 804 may be a type of computer-readable storage media and/or may be a tangible non-transitory media to the extent that when mentioned, non-transitory computer-readable media exclude media such as energy, carrier signals, electromagnetic waves and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 102. Functional components stored in the computer-readable media 804 may include the inventory recommendation module 130, the money advance module 140 and the payment processing module 216. Additional functional components stored in the computer-readable media 804 may include an operating system 808 for controlling and managing various functions of the service computing device 102. The computer-readable media 804 may also include the transaction data store 128. The service computing device 102 may also include or maintain other functional components and data, such as other modules and data 810, which may include programs, drivers, etc., and the data used or generated by the functional components. Further, the service computing device 102 may include many other logical, programmatic and physical components, of which those described above are merely examples that are related to the discussion herein.

The communication interface(s) 806 may include one or more interfaces and hardware components for enabling communication with various other devices, such as over the network(s) 108. For example, communication interface(s) 806 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The service computing device 102 may further be equipped with the input/output (I/O) devices 812. Such I/O devices 812 may include a display, various user interface controls (e.g., buttons, joystick, keyboard, mouse, touch screen, etc.), audio speakers, connection ports and so forth.

Figure 9:
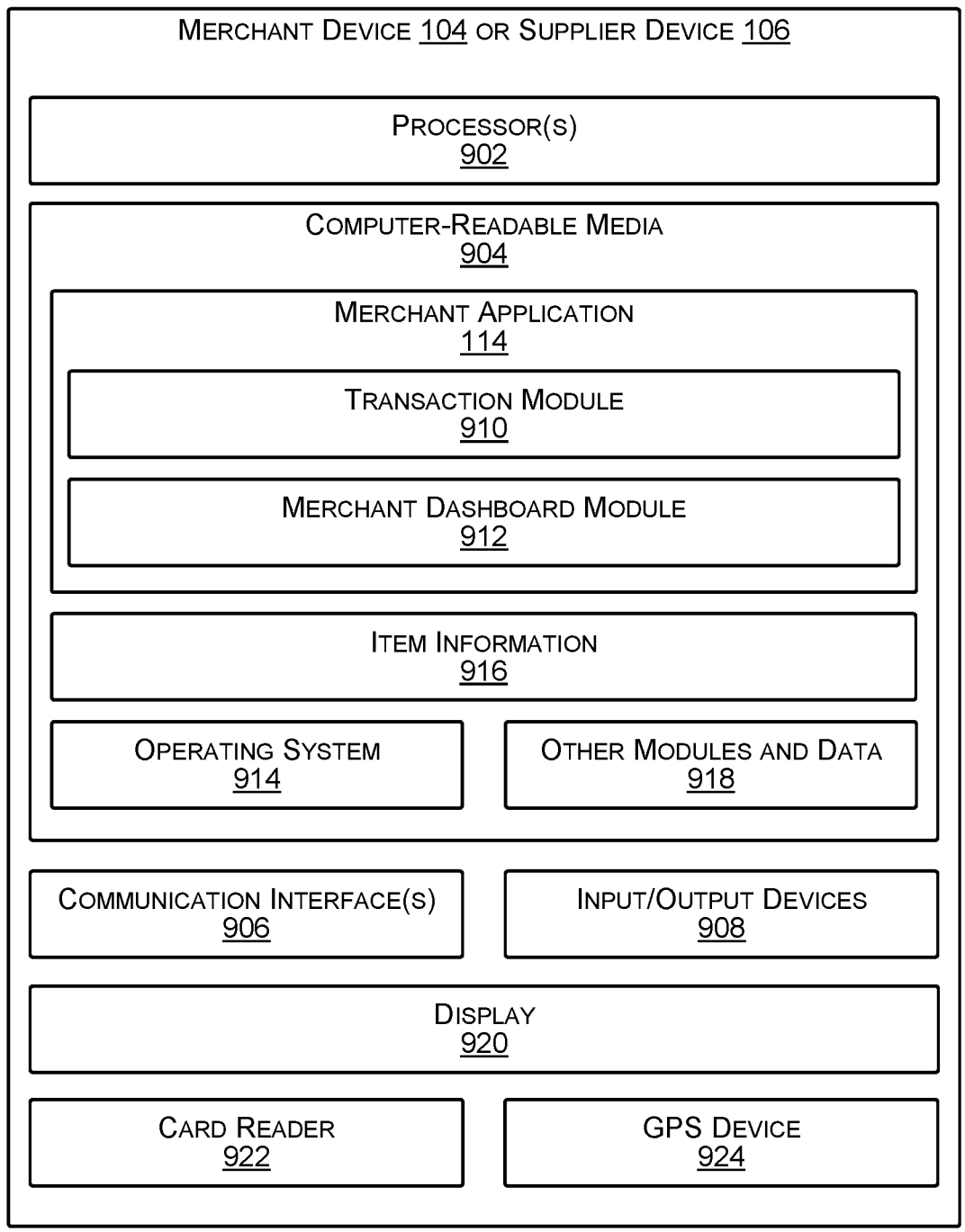
FIG. 9 illustrates select example components of an example merchant device or an example supplier device according to some implementations.

FIG. 9 illustrates select example components of an example merchant device 104 or an example supplier device 106 according to some implementations. The merchant device 104 or supplier device 106 may be any suitable type of computing device (e.g., portable, semi-portable, semi-stationary, or stationary). Some examples may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 104 or supplier device 106 includes at least one processor 802, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the merchant device 104, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 904 may include, but is not limited to, RAM, ROM, EEPROM, flash memory, solid-state storage, magnetic disk storage, optical storage, and/or other computer-readable media technology. Further, in some cases, the merchant device 104 or supplier device 106 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules or components that may be executed by the processor 902. Further, when mentioned, non-transitory computer-readable media exclude media such as energy, carrier signals, electromagnetic waves and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the merchant device 104 or supplier device 106. Functional components of the merchant device 104 or supplier device 106 stored in the computer-readable media 904 may include the merchant application 114. In this example, the merchant application 114 includes a transaction module 910 and a merchant dashboard module 912. For example, the transaction module 910 may present an interface, such as the payment interface, to enable the merchant to conduct transactions, receive payments, and so forth, as well as communicating with the service computing device 102 for processing payments and sending transaction information. Further, the merchant dashboard module 912 may present an interface to enable the merchant to manage the merchant's account, a merchant profile, merchant preferences, view inventory and/or recommendations and the like. Additional functional components may include an operating system 914 for controlling and managing various functions of the merchant device 104 or supplier device 106 and for enabling basic user interactions with the merchant device 104 or supplier device 106.

In addition, the computer-readable media 904 may also store data, data structures and the like, that are used by the functional components. For example, data stored by the computer-readable media 904 may include item information 916 that includes information about the items offered by the merchant, which may include a list of items currently available from the merchant, images of the items, descriptions of the items, prices of the items and so forth. Depending on the type of the merchant device 104 or supplier device 106, the computer-readable media 904 may also optionally include other functional components and data, such as other modules and data 918, which may include programs, drivers, etc., and the data used or generated by the functional components. Further, the merchant device 104 or supplier device 106 may include many other logical, programmatic and physical components, of which those described are merely examples that are related to the discussion herein.

The communication interface(s) 906 may include one or more interfaces and hardware components for enabling communication with various other devices, such as over the network(s) 108 or directly. For example, communication interface(s) 906 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 9 further illustrates that the merchant device 104 or supplier device 106 may include a display 920. Depending on the type of computing device used as the merchant device 104 or supplier device 106, the display 920 may employ any suitable display technology. For example, the display 920 may be a liquid crystal display, a plasma display, a light emitting diode display, an OLED (organic light-emitting diode) display, an electronic paper display, or any other suitable type of display able to present digital content thereon. In some examples, the display 920 may have a touch sensor associated with the display 920 to provide a touchscreen display configured to receive touch inputs for enabling interaction with a graphic interface presented on the display 920. Accordingly, implementations herein are not limited to any particular display technology. Alternatively, in some examples, the merchant device 104 or supplier device 106 may not include the display 920, and information may be present by other means, such as aurally.

The merchant device 104 or supplier device 106 may further include the one or more I/O devices 908. The I/O devices 908 may include speakers, a microphone, a camera, and various user controls (e.g., buttons, a joystick, a keyboard, a keypad, etc.), a haptic output device and so forth.

In addition, the merchant device 104 or supplier device 106 may include or may be connectable to a card reader 922. In some examples, the card reader 922 may plug in to a port in the merchant device 104 or supplier device 106, such as a microphone/headphone port, a data port or other suitable port. The card reader 922 may include a read head for reading a magnetic strip of a payment card, and further may include encryption technology for encrypting the information read from the magnetic strip. Alternatively, numerous other types of card readers may be employed with the merchant device 104 or supplier device 106 herein, depending on the type and configuration of the merchant device 104 or supplier device 106.

Other components included in the merchant device 104 or supplier device 106 may include various types of sensors, which may include a GPS device 924 able to indicate location information, as well as other sensors (not shown) such as an accelerometer, gyroscope, compass, proximity sensor and the like. Additionally, the merchant device 104 or supplier device 106 may include various other components that are not shown, examples of which include removable storage, a power source, such as a battery and power control unit and so forth.

Figure 10:
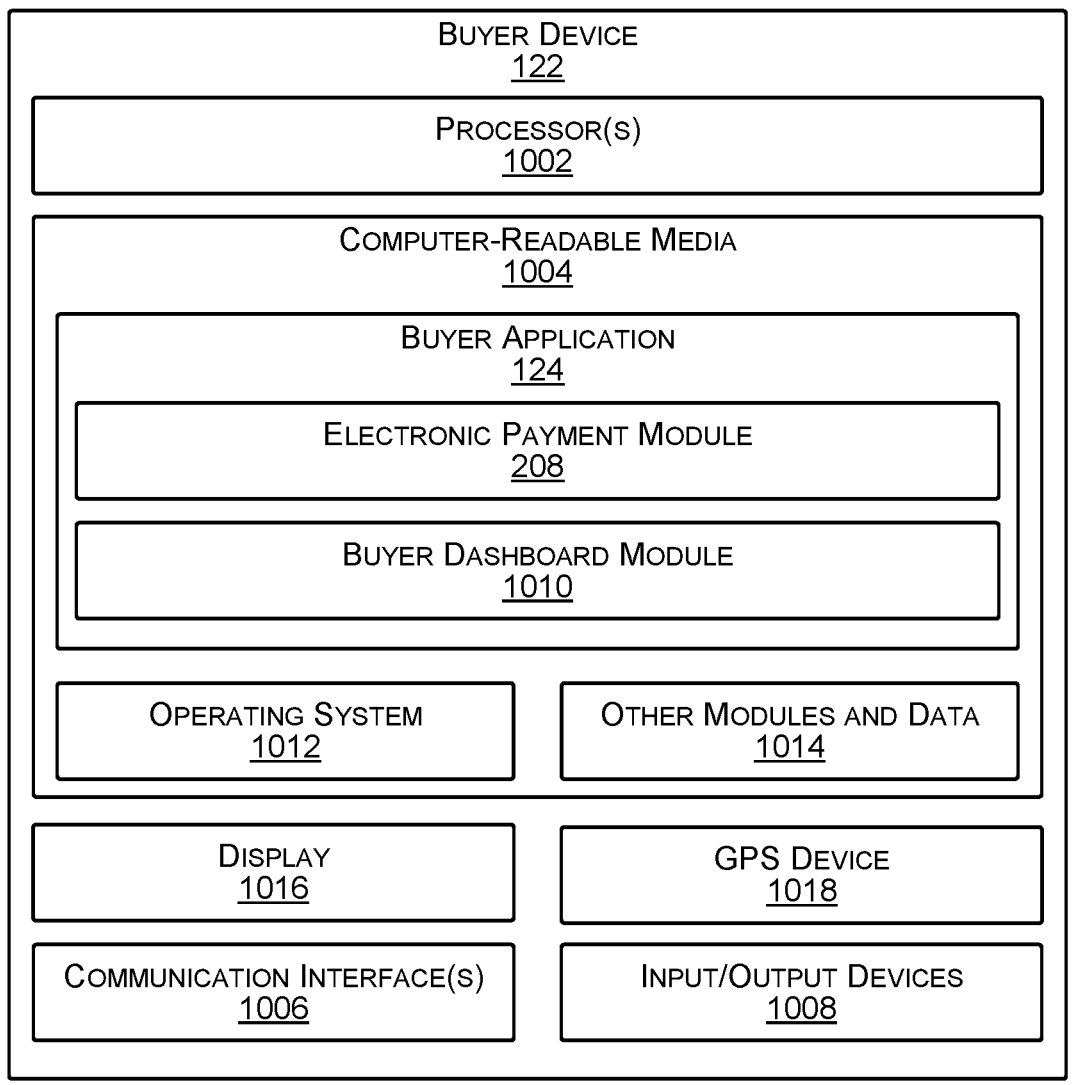
FIG. 10 illustrates select example components of a buyer device that may implement the functionality described above according to some examples.

FIG. 10 illustrates select example components of the buyer device 122 that may implement the functionality described above according to some examples. The buyer device 122 may be any of a number of different types of portable computing devices. Some examples of the buyer device 122 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 10, the buyer device 122 includes components such as at least one processor 1002, one or more computer-readable media 1004, the one or more communication interfaces 1006, and one or more input/output (I/O) devices 1008. Each processor 1002 may itself comprise one or more processors or processing cores. For example, the processor 1002 can be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 904.

Depending on the configuration of the buyer device 122, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1004 may include, but is not limited to, RAM, ROM, EEPROM, flash memory, solid-state storage, magnetic disk storage, optical storage, and/or other computer-readable media technology. Further, in some cases, the buyer device 122 may access external storage, such as RAID storage systems, storage arrays, network attached storage, storage area networks, cloud storage, or any other medium that can be used to store information and that can be accessed by the processor 1002 directly or through another computing device or network. Accordingly, the computer-readable media 1004 may be computer storage media able to store instructions, modules or components that may be executed by the processor 1002. Further, when mentioned, non-transitory computer-readable media exclude media such as energy, carrier signals, electromagnetic waves, and signals per se.

The computer-readable media 1004 may be used to store and maintain any number of functional components that are executable by the processor 1002. In some implementations, these functional components comprise instructions or programs that are executable by the processor 1002 and that, when executed, implement operational logic for performing the actions and services attributed above to the buyer device 122. Functional components of the buyer device 122 stored in the computer-readable media 1004 may include the buyer application 124, as discussed above. In this example, the buyer application 124 includes the electronic payment module 208, as discussed above, and a buyer dashboard module 1010. For example, the buyer dashboard module 1010 may present the buyer with an interface for managing the buyer's account, changing information, changing preferences and so forth. Additional functional components may include an operating system 1012 for controlling and managing various functions of the buyer device 122 and for enabling basic user interactions with the buyer device 122.

In addition, the computer-readable media 1004 may also store data, data structures and the like, that are used by the functional components. Depending on the type of the buyer device 122, the computer-readable media 1004 may also optionally include other functional components and data, such as other modules and data 1014, which may include applications, programs, drivers, etc., and the data used or generated by the functional components. Further, the buyer device 122 may include many other logical, programmatic and physical components, of which those described are merely examples that are related to the discussion herein.

The communication interface(s) 1006 may include one or more interfaces and hardware components for enabling communication with various other devices, such as over the network(s) 108 or directly. For example, the communication interface(s) 1006 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

FIG. 10 further illustrates that the buyer device 122 may include a display 1016. Depending on the type of computing device used as the buyer device 122, the display 1016 may employ any suitable display technology. For example, the display 1016 may be a liquid crystal display, a plasma display, a light emitting diode display, an OLED (organic light-emitting diode) display, an electronic paper display, or any other suitable type of display able to present digital content thereon. In some examples, the display 1016 may have a touch sensor associated with the display 1016 to provide a touchscreen display configured to receive touch inputs for enabling interaction with a graphic interface presented on the display 1016. Accordingly, implementations herein are not limited to any particular display technology. Alternatively, in some examples, the buyer device 122 may not include a display.

The buyer device 122 may further include the one or more I/O devices 1008. The I/O devices 1008 may include speakers, a microphone, a camera, and various user controls (e.g., buttons, a joystick, a keyboard, a keypad, etc.), a haptic output device and so forth.

Other components included in the buyer device 122 may include various types of sensors, which may include a GPS device 1018 able to indicate location information, as well as other sensors (not shown) such as an accelerometer, gyroscope, compass, proximity sensor and the like. Additionally, the buyer device 122 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   receiving, by at least one server computing device, transaction information from a plurality of computing devices associated with a plurality of merchants, the transaction information including item sales information for a plurality of items sold by the plurality of merchants;
   determining, by the at least one server computing device, based at least in part on a portion of the transaction information associated with a merchant of the plurality of merchants, a current inventory of an item for the merchant;
   determining, by the at least one server computing device, for the merchant and based at least in part on the current inventory of the item, a time that the merchant's inventory of the item is predicted to reach an inventory threshold;
   determining, by the at least one server computing device, based at least in part on the portion of the transaction information associated with the merchant, a level of risk associated with advancing funds to the merchant;
   based at least in part on (i) determining that the time that the merchant's inventory is predicted to reach the inventory threshold is within a threshold time and (ii) determining that the level of risk satisfies a risk threshold, automatically transferring funds for a purchase of additional inventory of the item to an account associated with the merchant, and causing, by the at least one server computing device, a recommendation that the merchant purchase the additional inventory of the item to be presented in a user interface on a display of a device associated with the merchant, wherein the user interface presents information about the current inventory determined for the item and further presents the recommendation including a quantity of the item for the purchase determined based at least on the time that the merchant's inventory is predicted to reach the inventory threshold, the user interface further including an interactive element selectable by the merchant to purchase an amount of the item and to finance at least a portion of the purchase with the funds transferred to the account of the merchant;
   receiving, by the at least one server computing device, and via the user interface presented on the device of the merchant, an indication of a user input interacting with the interactive element presented on the display of the device of the merchant; and
   based on receiving the indication of the user input interacting with the interactive element, purchasing the amount of the item using at least part of the funds transferred to the account for the purchase by sending, by the at least one server computing device, at least one instruction to a supplier of the item.

2. The method of claim 1, further comprising:
   determining an expected sales quantity associated with the additional inventory of the item, wherein the recommendation further comprises the expected sales quantity of the additional inventory of the item.

3. The method of claim 1, further comprising associating a restriction with use of the funds, the restriction requiring that at least a particular portion of the funds be used to purchase the additional inventory of the item for the merchant.

4. The method of claim 1, further comprising associating a restriction with use of the funds, the restriction requiring that an entirety of the funds be used to purchase the additional inventory of the item for the merchant.

5. The method of claim 1, wherein determining the level of risk associated with advancing the funds to the merchant is further based at least in part on a quantity of sales of the item made by the merchant over a past time period.

6. The method of claim 1, wherein determining the level of risk associated with advancing the funds to the merchant is further based at least in part on a profit of sales of the item made by the merchant over a past time period.

7. The method of claim 1, wherein determining the level of risk associated with advancing the funds to the merchant is further based at least in part on a prediction associated with a portion of the funds that will be used for purchasing the additional inventory.

8. The method of claim 1, wherein determining the time that the merchant's inventory is predicted to reach the inventory threshold is further based at least in part on a sales rate of the item with respect to at least one other merchant of the plurality of merchants that is determined to be in a same merchant category as the merchant.

9. A system comprising:
   a first point-of-sale (POS) application executable by a first computing device of a first merchant of a plurality of merchants associated with a payment service, wherein the first POS application configures the first computing device of the first merchant as a first POS terminal and the first POS application generates first transaction information associated with first item sales of the first merchant;
a second point-of-sale (POS) application executable by a second computing device of a second merchant of the plurality of merchants associated with the payment service, wherein the second POS application configures the second computing device of the second merchant as a second POS terminal and the second POS application generates second transaction information associated with second item sales of the second merchant;
at least one server computing device associated with the payment service, wherein the at least one server computing device is configured to:
receive, by the at least one server computing device, the first transaction information and the second transaction information;
determine, by the at least one server computing device, based at least in part on the first transaction information and the second transaction information, item sales information for a plurality of items associated with the first merchant and the second merchant;
predict, by the at least one server computing device, based at least in part on the item sales information, a time that an inventory of an item of the first merchant is predicted to reach an inventory threshold;
determine, by the at least one server computing device, a level of risk associated with advancing funds to the first merchant for ordering the item;
based at least in part on (i) determining that the time that the inventory of the item of the first merchant is predicted to reach the inventory threshold is within a threshold time and (ii) determining that the level of risk satisfies a risk threshold, automatically transfer funds for a purchase of additional inventory of the item to an account associated with the first merchant, and cause, by the at least one server computing device, a recommendation to purchase the additional inventory of the item to be presented in a user interface on a display of the first computing device, wherein the user interface presents information about the current inventory determined for the item and further presents the recommendation, the user interface further including an interactive element selectable by the first merchant to purchase an amount of the item and to finance at least a portion of the purchase with the funds transferred to the account of the first merchant;
receive, by the at least one server computing device, and via the user interface presented on the display of the first computing device, an indication of a user input interacting with the interactive element presented on the display of the first computing device; and
based on receiving the indication of the user input interacting with the interactive element, purchase the amount of the item using at least part of the funds transferred to the account for the purchase by sending, by the at least one server computing device, at least one instruction to a supplier of the item.

10. The system of claim 9, further comprising determining an expected sales quantity associated with the inventory of the item, wherein the recommendation further comprises the expected sales quantity of the inventory of the item.

11. The system of claim 9, further comprising associating a restriction with use of the funds, the restriction requiring that (i) at least a particular portion of the funds be used to purchase the inventory of the item for the first merchant, or (ii) an entirety of the funds be used to purchase the inventory of the item for the first merchant.

12. The system of claim 9, wherein determining the level of risk associated with advancing the funds to the first merchant is further based at least in part on one or more of (i) a quantity of sales of the item made by the first merchant over a past time period or (ii) a profit of sales of the item made by the first merchant over the past time period.

13. The system of claim 9, wherein determining the level of risk associated with advancing the funds to the first merchant is further based at least in part on a prediction associated with a portion of the funds that will be used for purchasing the inventory.

14. The system of claim 9, wherein determining the time that the inventory of the item of the first merchant is predicted to reach the inventory threshold is further based at least in part on a sales rate of the item with respect to at least one other merchant of the plurality of merchants that is determined to be in a same merchant category as the first merchant.

15. One or more non-transitory computer-readable media maintaining instructions that, when executed by one or more processors, program the one or more processors to:
receive, by at least one server computing device, transaction information from a plurality of computing devices associated with a plurality of merchants, the transaction information including item sales information for a plurality of items sold by the plurality of merchants;
predict, by the at least one server computing device, based at least in part on the item sales information, a time that the inventory of the item of the first merchant is predicted to reach an inventory threshold;
determine, by the at least one server computing device, a level of risk associated with advancing funds to the merchant for ordering the item;
based at least in part on (i) determining that the time that the inventory of the item of the merchant is predicted to reach the inventory threshold is within a threshold time and (ii) determining that the level of risk satisfies a risk threshold, automatically transfer funds for a purchase of additional inventory of the item to an account associated with the merchant, and cause, by the at least one server computing device, a recommendation to purchase the additional inventory of the item to be presented in a user interface on a display of a device associated with the merchant, wherein the user interface presents information about the current inventory determined for the item and further presents the recommendation, the user interface further including an interactive element selectable by the merchant to purchase an amount of the item and to finance at least a portion of the purchase with funds transferred to the account of the merchant;
receive, by the at least one server computing device, and via the user interface presented on the device of the merchant, an indication of a user input interacting with the interactive element presented on the display of the computing device; and
based on receiving the indication of the user input interacting with the interactive element, purchase the amount of the item using at least part of the funds transferred to the account for the purchase by sending, by the at least one server computing device, at least one instruction to a supplier of the item.

16. The one or more non-transitory computer-readable media of claim 15, wherein the instructions further program the one or more processors to determine an expected sales quantity associated with the inventory of the item,
wherein the recommendation further comprises the expected sales quantity of the inventory of the item.

17. The one or more non-transitory computer-readable media of claim 16, wherein the instructions further program the one or more processors to associate a restriction with use of the funds, the restriction requiring that (i) at least a particular portion of the funds be used to purchase the inventory of the item for the merchant, or (ii) an entirety of the funds be used to purchase the inventory of the item for the merchant.

18. The one or more non-transitory computer-readable media of claim 15, wherein the instructions further program the one or more processors to determine the level of risk associated with advancing the funds to the merchant based at least in part on one or more of (i) a quantity of sales of the item made by the merchant over a past time period or (ii) a profit of sales of the item made by the merchant over the past time period.

19. The one or more non-transitory computer-readable media of claim 15, wherein the instructions further program the one or more processors to determine the level of risk associated with advancing the funds based at least in part on a prediction associated with a portion of the funds that will be used for purchasing the inventory.

20. The one or more non-transitory computer-readable media of claim 15, wherein determining the time that the merchant's inventory is predicted to reach the inventory threshold is further based at least in part on a sales rate of the item with respect to at least one other merchant of the plurality of merchants that is determined to be in a same merchant category as the merchant.

* * * * *

UNITED STATES PATENT AND TRADEMARK OFFICE
CERTIFICATE OF CORRECTION

PATENT NO. : 11,501,366 B1
APPLICATION NO. : 16/777522
DATED : November 15, 2022
INVENTOR(S) : Michael Morrissey Cieri et al.

It is certified that error appears in the above-identified patent and that said Letters Patent is hereby corrected as shown below:

In the Claims

In Claim 15, at Column 30, Line 36, please cancel the text "the inventory of the item of the first merchant is", and, in place of the canceled text, please insert the following:
-- an inventory of an item of a merchant is --

Signed and Sealed this
Twenty-seventh Day of December, 2022

Katherine Kelly Vidal
Director of the United States Patent and Trademark Office